US012787050B2

(12) United States Patent
Huang et al.

(10) Patent No.: US 12,787,050 B2
(45) Date of Patent: Nov. 3, 2026

(54) UPLINK SWITCHING FOR CONCURRENT TRANSMISSIONS

(71) Applicant: QUALCOMM INCORPORATED, San Diego, CA (US)

(72) Inventors: Yi Huang, San Diego, CA (US); Juan Montojo, San Diego, CA (US); Wei Yang, San Diego, CA (US); Peter Gaal, San Diego, CA (US); Yiqing Cao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 18/712,225

(22) PCT Filed: Jan. 10, 2022

(86) PCT No.: PCT/CN2022/070914

§ 371 (c)(1),
(2) Date: May 21, 2024

(87) PCT Pub. No.: WO2023/130421

PCT Pub. Date: Jul. 13, 2023

(65) Prior Publication Data

US 2025/0016817 A1 Jan. 9, 2025

(51) Int. Cl.
*H04W 72/563* (2023.01)
*H04W 72/1268* (2023.01)
*H04W 72/50* (2023.01)

(52) U.S. Cl.
CPC ...... *H04W 72/563* (2023.01); *H04W 72/1268* (2013.01); *H04W 72/50* (2023.01)

(58) Field of Classification Search
CPC ............... H04W 72/563; H04W 72/50; H04W 72/1268

(Continued)

(56) References Cited

U.S. PATENT DOCUMENTS

2018/0367986 A1 12/2018 Sundararajan et al.
2018/0375627 A1 12/2018 Suzuki et al.

(Continued)

FOREIGN PATENT DOCUMENTS

CN 111819814 A 10/2020
CN 113630229 A 11/2021

OTHER PUBLICATIONS

ETSI: "LTE, Evolved Universal Terrestrial Radio Access (E-UTRA), User Equipment (UE) Radio Access Capabilities (3GPP TS 36.306 version 10.8.0 Release 10)", ETSI TS 136 306, V10.8.0 (Feb. 2013), 26 Pages, Jan. 1, 2013, Sections 4.3.4.6, 4.3.4.8, 4.3.4.12, https://www.etsi.org/deliver/etsi_ts/136300_136399/136306/10.08.00_60/ts_136306v100800p.pdf.

(Continued)

*Primary Examiner* — Jungwon Chang
(74) *Attorney, Agent, or Firm* — Holland & Hart LLP

(57) ABSTRACT

Methods, systems, and devices for wireless communication are described. In some systems, a user equipment (UE) may receive one or more signals indicating first and second uplink messages that at least partially overlap in time. The first uplink message may be associated with a first set of parameters and a first quantity of antenna ports and the second uplink message may be associated with a second set of parameters and a second quantity of antenna ports. The UE may transmit the first and second uplink messages using a third set of scheduling parameters based on a sum of the first quantity and the second quantity of antenna ports being greater than a quantity of available radio frequency (RF) chains at the UE. The third set of scheduling parameters may be associated with a third quantity of antenna ports that is less than the sum of the first and second quantities.

30 Claims, 20 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2020/0220592 | A1* | 7/2020 | Ryu | H04B 7/0691 |
| 2021/0345390 | A1 | 11/2021 | Okamura et al. | |
| 2022/0060307 | A1* | 2/2022 | Manolakos | H04L 5/0048 |
| 2023/0105787 | A1* | 4/2023 | Chen | H04B 7/0404 370/329 |
| 2023/0171756 | A1* | 6/2023 | Abdelghaffar | H04W 72/0446 370/336 |
| 2023/0275730 | A1* | 8/2023 | Go | H04L 5/0048 370/329 |
| 2023/0309091 | A1* | 9/2023 | Rico Alvarino | H04L 5/001 |

OTHER PUBLICATIONS

Supplementary European Search Report—EP22917893—Search Authority—Jul. 28, 2025 (2108404EP).

Huawei: "Uplink Transmission Modes", 3GPP TSG RAN WG1 meeting #61, R1-103108, Montreal, Canada, May 10-14, 2010, May 14, 2010, 3 Pages, the whole document.

International Search Report and Written Opinion—PCT/CN2022/070914—ISA/EPO—Aug. 30, 2022 (2108404WO1).

Moderator (China Telecom): "[107-e-NR-R17-TxSwitching-01] Summary of Email Discussion on Rel-17 Uplink Tx Switching", 3GPP TSG RAN WG1#107-e, R1-2112826, e-Meeting, Nov. 11-19, 2021, Nov. 19, 2021, pp. 1-19, the whole document.

* cited by examiner

UPLINK SWITCHING FOR CONCURRENT TRANSMISSIONS

CROSS REFERENCE

The present Application is a 371 national stage filing of International PCT Application No. PCT/CN2022/070914 by Huang et al. entitled "UPLINK SWITCHING FOR CONCURRENT TRANSMISSIONS," filed Jan. 10, 2022, which is assigned to the assignee hereof, and which is expressly incorporated by reference in its entirety herein.

FIELD OF TECHNOLOGY

The following relates to wireless communication, including uplink switching for concurrent transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be configured to support communications over two or more component carriers. For example, the UE may be configured with one or more radio frequency (RF) chains that may be configured to transmit on different component carriers. In some cases, the UE may receive signaling that schedules uplink transmissions by the UE, and the UE may perform uplink switching to switch the RF chains between component carriers for each of the scheduled uplink transmissions.

SUMMARY

The described techniques relate to improved methods, systems, devices, and apparatuses that support uplink switching for concurrent transmissions. Generally, the described techniques provide for a user equipment (UE) to override one or more sets of parameters for transmission of uplink messages that at least partially overlap in time. The UE may receive one or more signals from a base station that indicate a first uplink message and a second uplink message that at least partially overlap in time (e.g., concurrent or simultaneous uplink transmissions). The first uplink message may be associated with a first set of parameters including a first quantity of antenna ports. The second uplink message may be associated with a second set of parameters including a second quantity of antenna ports. For example, the first set of parameters and the second set of parameters may indicate a quantity of transmission layers (e.g., a transmission rank), a precoder, one or more other transmission parameters, or any combination thereof that are associated with transmission of the first and second uplink messages using the first and second quantities of antenna ports, respectively.

If a sum of the first quantity of antenna ports indicated via the first set of parameters and the second quantity of antenna ports indicated via the second set of parameters is greater than a quantity of available radio frequency (RF) chains at the UE, the UE may identify or determine a third set of parameters that overrides at least one parameter of the first set of parameters or the second set of parameters. The UE may transmit the first uplink message and the second uplink message to the base station in accordance with the third set of parameters, which may be associated with a third quantity of antenna ports that is less than or the same as the quantity of available RF chains at the UE. The UE may thereby override one or more scheduled transmission parameters to support concurrent uplink transmissions using a quantity of available RF chains, which may reduce latency, improve throughput, and improve communication reliability.

A method for wireless communication at a UE is described. The method may include receiving one or more signals indicating a first uplink message and a second uplink message that at least partially overlap in time, the first uplink message associated with a first set of parameters including a first quantity of antenna ports, the second uplink message associated with a second set of parameters including a second quantity of antenna ports and transmitting the first uplink message and the second uplink message according to a third set of parameters that overrides at least one parameter of the first set of parameters or the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

An apparatus for wireless communication at a UE is described. The apparatus may include a processor, memory coupled with the processor, and instructions stored in the memory. The instructions may be executable by the processor to cause the apparatus to receive one or more signals indicating a first uplink message and a second uplink message that at least partially overlap in time, the first uplink message associated with a first set of parameters including a first quantity of antenna ports, the second uplink message associated with a second set of parameters including a second quantity of antenna ports and transmit the first uplink message and the second uplink message according to a third set of parameters that overrides at least one parameter of the first set of parameters or the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

Another apparatus for wireless communication at a UE is described. The apparatus may include means for receiving one or more signals indicating a first uplink message and a second uplink message that at least partially overlap in time, the first uplink message associated with a first set of parameters including a first quantity of antenna ports, the second uplink message associated with a second set of parameters including a second quantity of antenna ports and means for transmitting the first uplink message and the second uplink message according to a third set of parameters that overrides at least one parameter of the first set of parameters or the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

A non-transitory computer-readable medium storing code for wireless communication at a UE is described. The code may include instructions executable by a processor to receive one or more signals indicating a first uplink message and a second uplink message that at least partially overlap in time, the first uplink message associated with a first set of parameters including a first quantity of antenna ports, the second uplink message associated with a second set of parameters including a second quantity of antenna ports and transmit the first uplink message and the second uplink message according to a third set of parameters that overrides at least one parameter of the first set of parameters or the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

In some examples of the method, apparatuses, and non-transitory computer-readable medium described herein, transmitting the first uplink message and the second uplink message may include operations, features, means, or instructions for multiplexing a payload of the first uplink message with the second uplink message and transmitting the second uplink message and the payload of the first uplink message based on the multiplexing and in accordance with the third quantity of antenna ports, where the third quantity of antenna ports may be the same as the second quantity of antenna ports that may be associated with the second uplink message.

In some examples of the method, apparatuses, and non-transitory computer-readable medium described herein, multiplexing the payload of the first uplink message with the second uplink message may include operations, features, means, or instructions for multiplexing the payload of the first uplink message with the second uplink message based on a rank for transmission of the second uplink message being greater than a threshold rank.

In some examples of the method, apparatuses, and non-transitory computer-readable medium described herein, transmitting the first uplink message and the second uplink message may include operations, features, means, or instructions for transmitting the first uplink message using the first quantity of antenna ports based on a first uplink precoder of the first set of parameters and transmitting the second uplink message using a subset of one or more antenna ports of the second quantity of antenna ports based on a third uplink precoder of the third set of parameters, where the third uplink precoder overrides a second uplink precoder that may be indicated via the second set of parameters, and where the third quantity of antenna ports may be based on a second sum of the first quantity of antenna ports and a quantity of antenna ports of the subset of one or more antenna ports.

In some examples of the method, apparatuses, and non-transitory computer-readable medium described herein, transmitting the second uplink message may include operations, features, means, or instructions for transmitting the second uplink message using the subset of one or more antenna ports based on a rank for transmission of the second uplink message being less than a threshold rank.

In some examples of the method, apparatuses, and non-transitory computer-readable medium described herein, transmitting the second uplink message may include operations, features, means, or instructions for transmitting the second uplink message using a second quantity of transmission layers based on the third set of parameters overriding the second set of parameters, where the second set of parameters indicates a rank associated with a first quantity of transmission layers that may be greater than the second quantity of transmission layers.

In some examples of the method, apparatuses, and non-transitory computer-readable medium described herein, transmitting the first uplink message and the second uplink message may include operations, features, means, or instructions for transmitting the first uplink message via a physical uplink control channel (PUCCH) and transmitting the second uplink message via a physical uplink shared channel (PUSCH).

In some examples of the method, apparatuses, and non-transitory computer-readable medium described herein, transmitting the first uplink message and the second uplink message may include operations, features, means, or instructions for transmitting the first uplink message via a first component carrier and transmitting the second uplink message via a second component carrier.

A method for wireless communication at a base station is described. The method may include transmitting, to a UE, one or more signals indicating a first uplink message and a second uplink message that at least partially overlap in time, the first uplink message associated with a first set of parameters including a first quantity of antenna ports, and the second uplink message associated with a second set of parameters including a second quantity of antenna ports and receiving, from the UE, the first uplink message and the second uplink message according to a third set of parameters that overrides at least one parameter of the first set of parameters and the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

An apparatus for wireless communication at a base station is described. The apparatus may include a processor, memory coupled with the processor, and instructions stored in the memory. The instructions may be executable by the processor to cause the apparatus to transmit, to a UE, one or more signals indicating a first uplink message and a second uplink message that at least partially overlap in time, the first uplink message associated with a first set of parameters including a first quantity of antenna ports, and the second uplink message associated with a second set of parameters including a second quantity of antenna ports and receive, from the UE, the first uplink message and the second uplink message according to a third set of parameters that overrides at least one parameter of the first set of parameters and the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

Another apparatus for wireless communication at a base station is described. The apparatus may include means for transmitting, to a UE, one or more signals indicating a first uplink message and a second uplink message that at least partially overlap in time, the first uplink message associated with a first set of parameters including a first quantity of antenna ports, and the second uplink message associated with a second set of parameters including a second quantity of antenna ports and means for receiving, from the UE, the first uplink message and the second uplink message according to a third set of parameters that overrides at least one parameter of the first set of parameters and the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

A non-transitory computer-readable medium storing code for wireless communication at a base station is described. The code may include instructions executable by a processor to transmit, to a UE, one or more signals indicating a first uplink message and a second uplink message that at least partially overlap in time, the first uplink message associated with a first set of parameters including a first quantity of antenna ports, and the second uplink message associated with a second set of parameters including a second quantity of antenna ports and receive, from the UE, the first uplink message and the second uplink message according to a third set of parameters that overrides at least one parameter of the first set of parameters and the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

In some examples of the method, apparatuses, and non-transitory computer-readable medium described herein, receiving the first uplink message and the second uplink message may include operations, features, means, or instructions for receiving the second uplink message and a payload of the first uplink message that may be multiplexed with the second uplink message in accordance with the third quantity of antenna ports, where the third quantity of antenna ports may be the same as the second quantity of antenna ports that may be associated with the second uplink message.

In some examples of the method, apparatuses, and non-transitory computer-readable medium described herein, the first set of parameters further indicates a rank for transmission of the second uplink message and the payload of the first uplink message may be multiplexed with the second uplink message based on the rank being greater than a threshold rank.

In some examples of the method, apparatuses, and non-transitory computer-readable medium described herein, receiving the first uplink message and the second uplink message may include operations, features, means, or instructions for receiving the first uplink message in accordance with the first quantity of antenna ports based on a first uplink precoder of the first set of parameters and receiving the second uplink message in accordance with a subset of one or more antenna ports of the second quantity of antenna ports based on a third uplink precoder of the third set of parameters, where the third uplink precoder overrides a second uplink precoder that may be indicated via the second set of parameters, and where the third quantity of antenna ports may be based on a second sum of the first quantity of antenna ports and a quantity of antenna ports of the subset of one or more antenna ports.

In some examples of the method, apparatuses, and non-transitory computer-readable medium described herein, receiving the second uplink message may include operations, features, means, or instructions for receiving the second uplink message in accordance with the subset of one or more antenna ports based on a rank for transmission of the second uplink message being less than a threshold rank.

In some examples of the method, apparatuses, and non-transitory computer-readable medium described herein, receiving the second uplink message may include operations, features, means, or instructions for receiving the second uplink message using a second quantity of transmission layers based on the third set of parameters overriding the second set of parameters, where the second set of parameters indicates a rank associated with a first quantity of transmission layers that may be greater than the second quantity of transmission layers.

In some examples of the method, apparatuses, and non-transitory computer-readable medium described herein, receiving the first uplink message and the second uplink message may include operations, features, means, or instructions for receiving the first uplink message via a PUCCH and receiving the second uplink message via a PUSCH.

In some examples of the method, apparatuses, and non-transitory computer-readable medium described herein, receiving the first uplink message and the second uplink message may include operations, features, means, or instructions for receiving the first uplink message via a first component carrier and receiving the second uplink message via a second component carrier.

DETAILED DESCRIPTION

Figure 1:
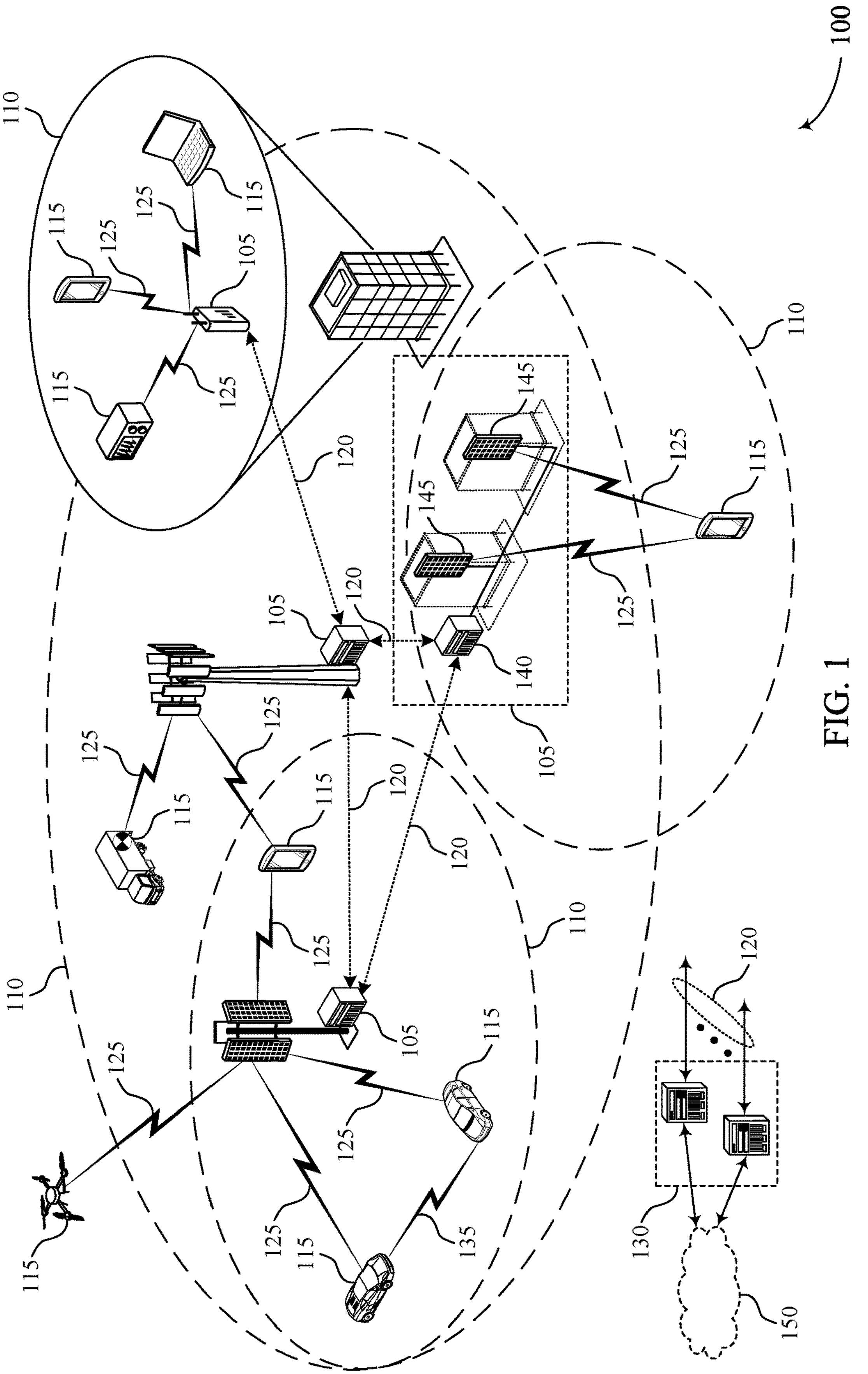
FIG. 1 illustrates an example of a wireless communications system that supports uplink switching for concurrent transmissions in accordance with aspects of the present disclosure.

In some wireless communications systems, a user equipment (UE) may support two or more concurrent uplink messages on a same or different component carrier using two or more radio frequency (RF) chains, which may be referred to as transmit or receive chains. An RF chain (e.g., a transmit chain or receive chain) may refer to circuitry or components capable of generating and transmitting an uplink message by the UE (or in case of a receiving, an RF chain may be capable of receiving and decoding a message received by the UE). At a given time, each RF chain may be mapped to a single antenna port at the UE for transmission of an uplink signal. The RF chains may be configured to dynamically switch between antenna ports, between frequency bands, between component carriers, or any combination thereof. For example, a UE configured with two RF chains may be configured to transmit uplink messages on two component carriers using a single RF chain on each component carrier, or the UE may be configured to transmit on one of the component carriers using both of the RF chains and refrain from transmitting on the other component carrier at the same time. The UE may dynamically switch between RF chain configurations that specify how the UE is to perform transmission by one or more RF chains or switching between RF chains.

A UE as described herein may support carrier aggregation over two or more component carriers. The UE may support concurrent transmission of a first uplink message on a first component carrier and a second uplink message on a second component carrier. Concurrent transmission may correspond to simultaneous transmission or transmission of the uplink messages in resources that at least partially overlap in time. In some examples, the first uplink message may be transmitted via an uplink control channel, such as a physical uplink control channel (PUCCH) and the second uplink message may be transmitted via an uplink data channel, such as a physical uplink shared channel (PUSCH), or some other uplink channel. The UE may receive one or more signals from a base station that indicate (e.g., schedule or configure) the first and second uplink messages. The first uplink message may be associated with a first set of parameters that may include or indicate a first quantity of antenna ports for transmission of the first uplink message and the second uplink message may be associated with a second set of parameters that may include or indicate a second quantity of antenna ports for transmission of the second uplink message. For example, the first and second sets of parameters may each indicate a respective rank (e.g., a quantity of transmission layers), a respective precoder, or both associated with the first uplink message and the second uplink message, respectively. In some cases, a sum of the first quantity of antenna ports and the second quantity of antenna ports may be greater than a quantity of available RF chains at the UE (e.g., RF chains that are not in use by the UE at the time of the scheduled transmissions).

Techniques described herein provide for the UE to override at least one parameter of the first set of parameters or the second set of parameters if the sum of the first quantity of antenna ports and the second quantity of antenna ports is greater than the quantity of available RF chains at the UE. The UE may determine a third set of parameters for transmitting the first and second uplink messages that may override the at least one parameter of the first set of parameters or the second set of parameters and that may be associated with a reduced quantity of antenna ports. For example, the third set of parameters may be associated with a third quantity of antenna ports that is the same as or less than the quantity of available RF chains at the UE. The UE may override the first or second sets of parameters to reduce the quantity of antenna ports by multiplexing a payload of the first uplink message with the second uplink message (e.g., multiplexing a PUCCH transmission with a PUSCH transmission), overriding a precoder scheduled for the first uplink message, the second uplink message, or both, overriding a rank scheduled for the first uplink message, the second uplink message, or both, or any combination thereof.

In some examples, the UE may be configured drop transmission of the first uplink message and multiplex a payload of the first uplink message with the second uplink message. The UE may transmit the second uplink message and the payload using a quantity of available RF chains at the UE, which may be less than the total quantity of antenna ports associated with the first and second sets of parameters combined. In some examples, the UE may override a precoder that indicates the UE is to use two or more antenna ports and corresponding RF chains for transmission of the first uplink message, the second uplink message, or both. The UE may select a different precoder that is associated with fewer RF chains and may perform the transmissions accordingly. In another example, the UE may override a rank that indicates the UE is to transmit the first uplink message, the second uplink message, or both using two or more transmission layers, where each transmission layer may be associated with a different antenna port and RF chain combination. The UE may transmit the first uplink message, the second uplink message, or both using fewer transmission layers (e.g., in accordance with a different rank), such that a quantity of the transmission layers may be the same as or less than a quantity of available RF chains at the UE. In some examples, the UE may determine whether to multiplex the messages or override a precoder based on a rank of the uplink messages being greater than a threshold rank. The UE may thereby transmit two or more uplink messages concurrently using an available quantity of RF chains at the UE by overriding one or more transmission parameters, which may reduce latency, improve throughput, and improve reliability of uplink communications by the UE.

Aspects of the disclosure are initially described in the context of wireless communications systems. Additional aspects are described in the with reference to uplink switching configurations, antenna port configurations, and process flows. Aspects of the disclosure are further illustrated by and described with reference to apparatus diagrams, system diagrams, and flowcharts that relate to uplink switching for concurrent transmissions.

FIG. 1 illustrates an example of a wireless communications system 100 that supports uplink switching for concurrent transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described herein, a UE 115 in the wireless communications system 100 may be configured to override a set of scheduling parameters for transmission of uplink messages that at least partially overlap in time. The UE 115 may receive a control message from a base station 105 that indicates a first set of scheduling parameters for transmission of a first uplink message and a second uplink message that at least partially overlap in time (e.g., concurrent or simultaneous uplink transmissions). The first set of scheduling parameters may indicate a first quantity of antenna ports associated with both the first uplink message and the second uplink message.

For example, the first set of scheduling parameters may indicate a quantity of transmission layers (e.g., a transmission rank), a precoder, one or more other transmission parameters, or any combination thereof that are associated with transmission of the first and second uplink messages using the first quantity of antenna ports. If the first quantity of antenna ports indicated via the first set of scheduling parameters is greater than a quantity of available RF chains at the UE 115, the UE 115 may identify or determine a second set of scheduling parameters that overrides the first set of scheduling parameters. The UE 115 may transmit the first uplink message and the second uplink message to the base station 105 in accordance with the second set of scheduling parameters, which may be associated with a second quantity of antenna ports that is less than or the same as the quantity of available RF chains at the UE 115. The UE 115 may thereby override one or more scheduled transmission parameters to support concurrent uplink transmissions using a quantity of available RF chains, which may reduce latency, improve throughput, and improve communication reliability.

Figure 2:
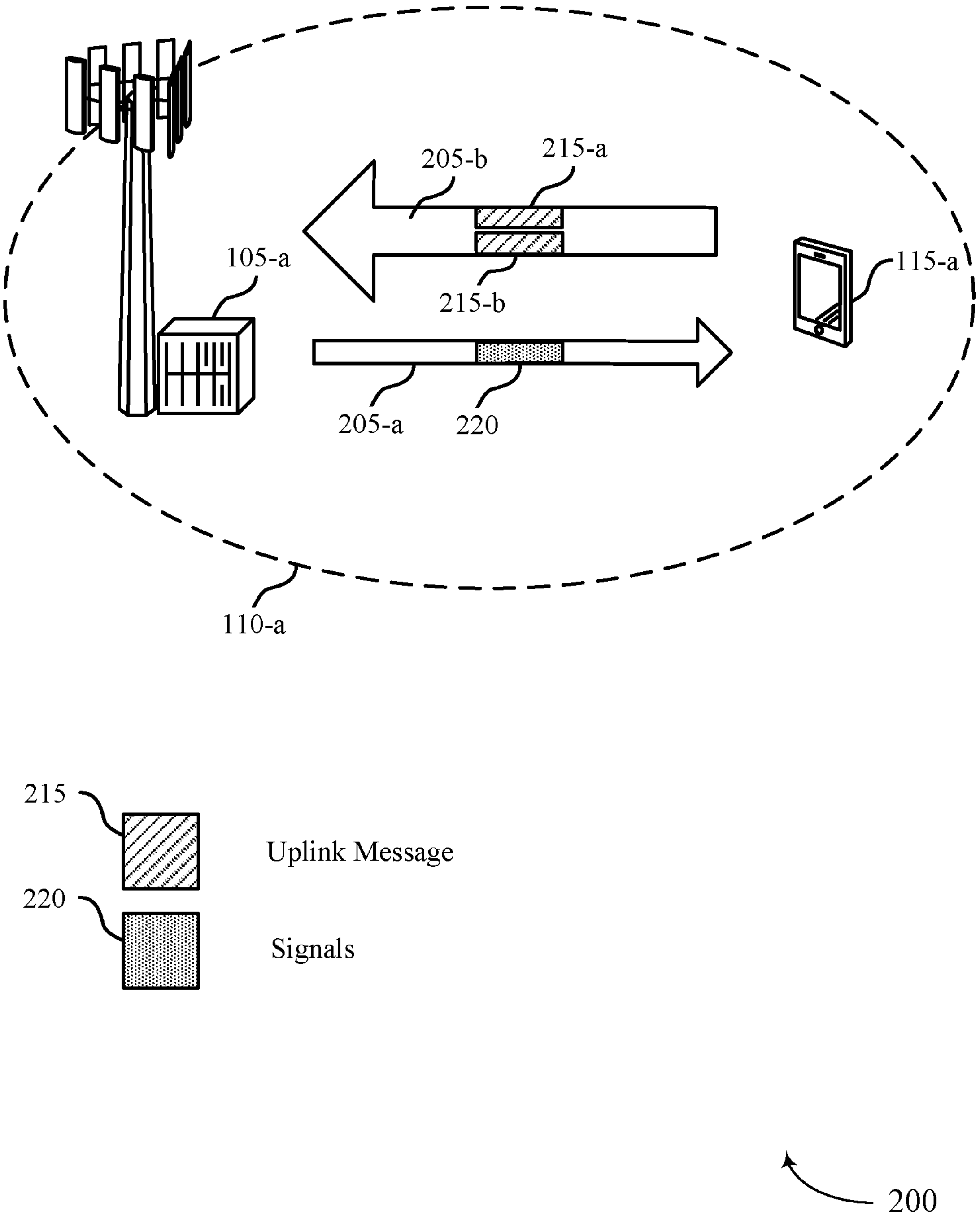
FIG. 2 illustrates an example of a wireless communications system that supports uplink switching for concurrent transmissions in accordance with aspects of the present disclosure.

FIG. 2 illustrates an example of a wireless communications system 200 that supports uplink switching for concurrent transmissions in accordance with aspects of the present disclosure. The wireless communications system 200 may implement or be implemented by aspects of the wireless communications system 100 as described with reference to FIG. 1. For example, the wireless communications system 200 may include a base station 105-*a* and a UE 115-*a*, which may represent examples of a base station 105 and a UE 115 as described with reference to FIG. 1. In some examples, the base station 105-*a* and the UE 115-*a* may be located within a geographic coverage area 110-*a*. The base station 105-*a* may communicate with the UE 115-*a* via one or more downlink communication links 205-*a* and one or more uplink communication links 205-*b*. The base station 105-*a* may transmit one or more signals 220 to the UE 115-*a* via the downlink communication link 205-*a* (e.g., in accordance with the subject matter disclosed herein), and the UE 115-*a* may transmit one or more uplink messages 215 (e.g., PUSCH transmissions, PUCCH transmissions, or both) to the base station 105-*a* via the uplink communication link 205-*b*.

The wireless communications system 200 may support communications between the UE 115-*a* and the base station 105-*a* using carrier aggregation, as described with reference to FIG. 1. For example, the UE 115-*a* may support uplink carrier aggregation over two or more uplink component carriers. Carrier aggregation may, in some cases, be used with both FDD and TDD carriers. For example, a first component carrier supported by the UE 115-*a* may be an FDD component carrier and a second component carrier supported by the UE 115-*a* may be a TDD component carrier. The UE 115-*a* may transmit uplink messages 215 to the base station 105-*a* via one or more uplink component carriers. In some examples, each uplink communication link 205-*b* may be associated with a respective uplink component carrier, or each uplink communication link 205-*b* may include multiple uplink component carriers.

The UE 115-*a* may be configured with a first quantity of RF chains (e.g., two RF chains), which may each include circuitry or components configured to generate and transmit a signal at the UE 115-*a*. An RF chain may, in some examples, be referred to as a transmit chain (or a receive chain in case of reception at the UE 115-*a*). A quantity of antenna ports at the UE 115-*a* may be the same as or different than the quantity of RF chains. A single RF chain may be used to generate a signal for transmission from a single antenna port (e.g., a one-to-one mapping for each transmission). The UE 115-*a* may transmit a total quantity of simultaneous transmissions that may not exceed a quantity of RF chains at the UE 115-*a*.

The UE 115-*a* may support communications on multiple component carriers, such as the FDD component carrier and the TDD component carrier, or some other carriers, using the first quantity of RF chains (e.g., two RF chains). The UE 115-*a* may perform uplink switching to switch RF chains between component carriers based on the rank supported by each of the component carriers, a scheduled rank for an uplink message 215, a scheduled precoder for the uplink message 215, or any combination thereof. A rank may correspond to a quantity of transmission layers permitted on or allocated for a respective component carrier or associated with a scheduled uplink message 215. For example, a rank of two may indicate that the UE 115-*a* may generate an uplink message 215-*a* having two layers, and each layer may be generated and transmitted by a respective RF chain and antenna port combination. A precoder may indicate a quantity of antenna ports (e.g., and corresponding beams) the UE 115-*a* may use to transmit an uplink message 215, among one or more other transmission parameters associated with the uplink message 215. The UE 115-*a* may dynamically switch transmit chains between the carriers to support TDM or FDM transmission of multiple uplink messages 215 over the two component carriers. Such uplink carrier aggregation and uplink switching techniques are described in further detail with reference to FIG. 3.

Some systems may not support simultaneous transmission of multiple uplink messages 215 (e.g., on different component carriers). For example, a system may not support transmission of a PUSCH message and PUCCH message that overlap in time. Stated alternatively, in some systems, a UE 115 may not be allowed to transmit on a PUSCH and a PUCCH simultaneously. In such cases, a base station 105 may refrain from scheduling overlapping PUSCH and PUCCH transmissions. Additionally or alternatively, if the UE 115 is scheduled to perform a PUSCH transmission that overlaps with a PUCCH transmission in time, the UE 115 may be configured to drop the PUCCH transmission and multiplex a payload of the PUCCH transmission with the PUSCH transmission. The UE 115 may transmit the PUSCH transmission and the payload of the PUCCH transmission on the PUSCH in a TDM manner using uplink switching.

The wireless communications system 200 as described herein may support transmission of two or more uplink messages 215 on different component carriers that overlap in the time domain. For example, the UE 115-*a* may support transmission of a first uplink message 215-*a* (e.g., via a PUCCH, or some other type of uplink channel) on a first component carrier and a second uplink message 215-*b* (e.g., via a PUSCH, or some other type of uplink channel) on a second component carrier via uplink resources that at least partially overlap in time. The base station 105-*a* may transmit one or more signals 220 to the UE 115-*a* to indicate, or schedule, transmission of the first uplink message 215-*a* and the second uplink message 215-*b* that at least partially overlap in time. The first uplink message 215-*a* may be associated with a first set of parameters and the second uplink message 215-*b* may be associated with a second set of parameters. In some examples, the first and second sets of parameters may be indicated via first and second signals 220. Each set of parameters may indicate a quantity of antenna ports associated with the respective uplink message 215, a quantity of RF chains associated with the respective uplink message 215, one or more resources for transmitting the respective uplink message 215, a rank of the respective uplink message 215, an uplink precoder for the respective uplink message 215, a modulation and coding scheme (MCS) for transmitting the respective uplink message 215, a transmission configuration indication (TCI) state associated with the respective uplink message 215, one or more other transmission parameters for the respective uplink message 215, or any combination thereof.

The first set of parameters may thereby include or indicate a first quantity of antenna ports for transmission of the first uplink message 215-*a*, and the second set of parameters may include or indicate a second quantity of antenna ports for transmission of the second uplink message 215-*b*. In some cases, a sum of the first quantity of antenna ports and the second quantity of antenna ports for the scheduled uplink messages 215-*a* and 215-*b* may be greater than a quantity of available RF chains at the UE 115-*a*. An available RF chain may correspond to an RF chain that is configured at the UE 115-*a* and is not in use by the UE 115-*a* for other communications at the time of the scheduled uplink transmission. In one example, the one or more signals 220 may indicate a first rank for the uplink message 215-*a* that is associated with a single transmission layer generated by a single antenna port (e.g., rank 1) and a second rank for the uplink message 215-*b* that is associated with two transmission layers generated by two antenna ports (e.g., rank 2). The total quantity of antenna ports for transmitting the first and second uplink messages 215-*a* and 215-*b* may thereby be three, but the UE 115-*a* may be configured with two available RF chains. In such cases, if a sum of antenna ports for transmission of overlapping uplink messages 215 is greater than a threshold quantity (e.g., a quantity of available RF chains at the UE 115-*a*), the UE 115-*a* may not know how to transmit the scheduled uplink messages 215 at the same time. For example, the UE 115-*a* may drop one or both of the transmissions, which may increase latency, reduce throughput, and reduce communication reliability.

Techniques described herein provide for the UE 115-*a* to override one or more scheduled transmission parameters to support simultaneous uplink transmissions. The UE 115-*a* may be configured to override a scheduled rank, a scheduled precoder, or both if a total quantity of antenna ports indicated for transmission of the first and second uplink messages 215 is greater than a quantity of RF chains that are available at the UE 115-*a*. The UE 115-*a* may additionally, or alternatively, be configured to multiplex a payload of the first scheduled uplink message 215-*a* with the second scheduled uplink message 215-*b* to reduce a quantity of antenna ports and corresponding RF chains. Stated alternatively, the UE 115-*a* may determine a third set of one or more parameters for transmission of the first and second uplink messages 215 that may override at least one parameter of the first set of parameters or the second set of parameters that are indicated to the UE 115-*a* via the one or more signals 220. If a sum of a first quantity of antenna ports associated with the uplink message 215-*a* and a second quantity of antenna ports associated with the uplink message 215-*b* (e.g., as indicated by the one or more signals 220), is the same as or less than a quantity of available RF chains at the UE 115-*a*, the UE 115-*a* may perform the scheduled uplink transmissions without overriding corresponding sets of parameters.

The UE 115-*a* may thereby transmit the first uplink message 215-*a* and the second uplink message 215-*b* simultaneously or at least partially overlapping in time using a quantity of available RF chains at the UE 115-*a* (e.g., one or two RF chains, or some other quantity). The first and second uplink messages 215 may be transmitted via a PUSCH, a PUCCH, some other uplink channel, or any combination thereof, and may be transmitted via a same component carrier or separate component carriers. By overriding at least one parameter for transmission of at least one of the uplink messages 215, the UE 115-*a* may provide for the base station 105-*a* to refrain from accounting for a quantity of RF chains at the UE 115-*a* while scheduling uplink transmissions, which may reduce overhead and complexity. For example, the base station 105-*a* may schedule uplink transmissions by the UE 115-*a* without knowing or accounting for a quantity of RF chains that are available at the UE 115-*a*. Techniques for multiplexing the uplink messages 215, overriding a scheduled precoder, and overriding a scheduled rank are described in further detail with reference to FIGS. 5-7.

Figure 3:
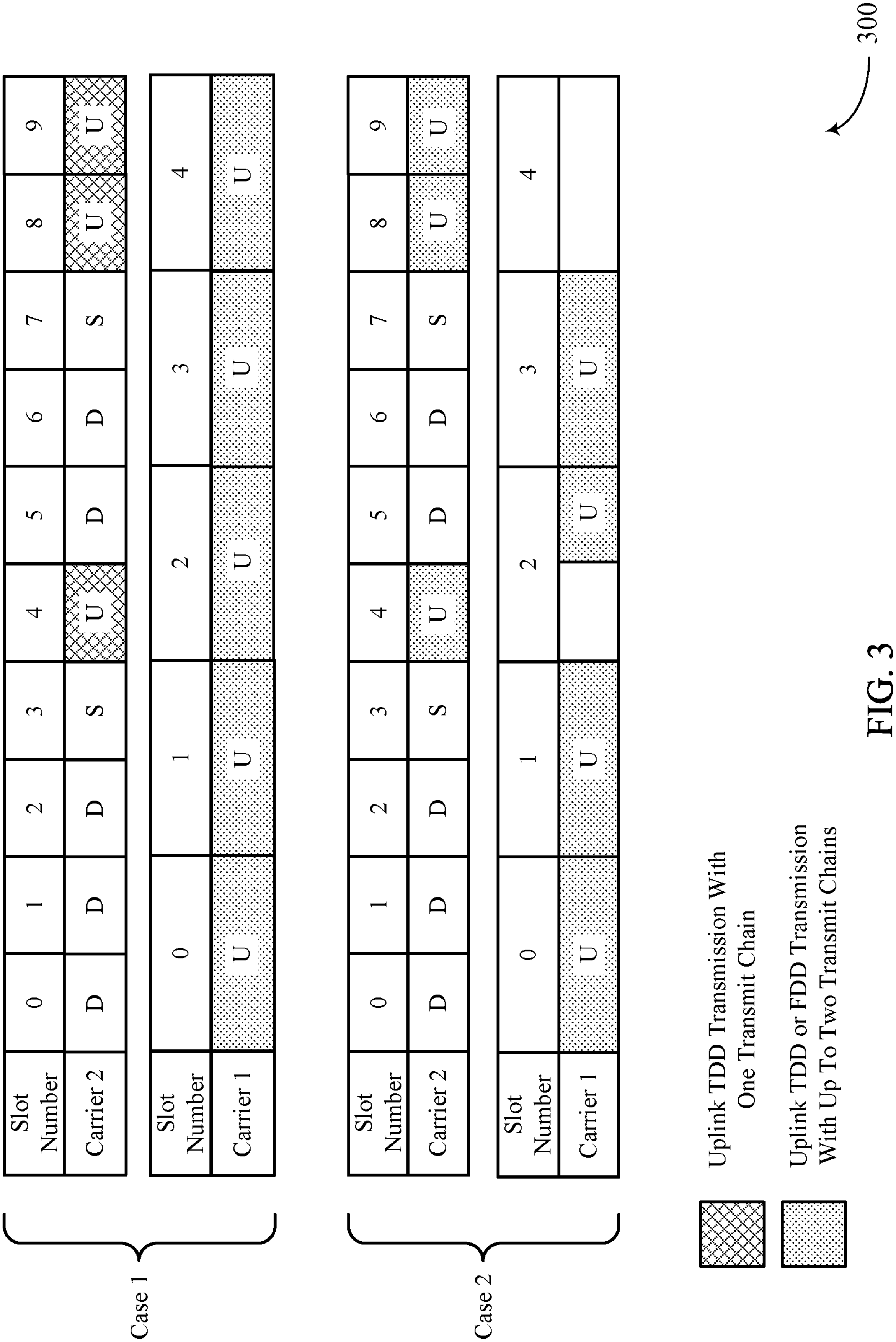
FIG. 3 illustrates an example of a uplink switching diagram that supports uplink switching for concurrent transmissions in accordance with aspects of the present disclosure.

FIG. 3 illustrates an example of a uplink switching diagram 300 that supports uplink switching for concurrent transmissions in accordance with aspects of the present disclosure. The uplink switching diagram 300 may implement or be implemented by aspects of the wireless communications systems 100 and 200 as described with reference to FIGS. 1 and 2. For example, the uplink switching diagram 300 may illustrate configurations for switching RF chains at a UE 115, which may represent an example of a UE 115 as described with reference to FIGS. 1 and 2. The UE 115 may switch the RF chains to perform uplink communications with a base station 105, which may represent an example of a base station 105 as described with reference to FIGS. 1 and 2.

In the example of FIG. 3, the UE 115 may be configured with two RF chains, which may be referred to as transmit chains. The UE may support uplink carrier aggregation (e.g., dual-connectivity (DC) or supplementary uplink (SUL) communications) over a first component carrier (e.g., Carrier 1) and a second component carrier (e.g., Carrier 2). The first component carrier may be an FDD component carrier and the second component carrier may be a TDD component carrier in the example of FIG. 3. The TDD component carrier may support up to two transmission layers at a time (e.g., up to rank 2). The FDD component carrier may support a single transmission layer at a time (e.g., up to rank 1). Each transmission layer may be generated and transmitted by a single RF chain and a single antenna port at the UE 115. That is, each RF chain may be mapped to a respective antenna port for transmission of a single layer.

The first and second component carriers may be associated with three or more potential transmission layers, and the UE 115 may perform uplink switching using two RF chains configured at the UE 115 to support uplink communications over the two component carriers. The UE 115 may dynamically switch the RF chains between the component carriers. The UE 115 may be configured to support uplink switching according to two or more cases. Example cases for uplink switching may be defined according to Table 1.

TABLE 1

| Transmission Cases For Uplink Switching | |
|---|---|
| Case 1 | 1 RF Chain on Carrier 1 and 1 RF Chain on Carrier 2 |
| Case 2 | 0 RF Chains on Carrier 1 and 2 RF Chains on Carrier 2 |

Case 1 and Case 2 in the example of Table 1 may be examples of RF chain and/or antenna port configurations for a UE 115 to handle multiple uplink transmissions on the Carrier 1 and the Carrier 2 that may at least partially overlap in time (e.g., concurrent transmissions in a same slot). As shown in the example of Table 1, during Case 1 the UE 115 may transmit a first uplink message on Carrier 1 using a first RF chain and a second uplink message on Carrier 2 using a second RF chain, and the first and second uplink messages may overlap in time. During Case 2, if the UE 115 has an uplink message to transmit on Carrier 2, the UE 115 may not transmit on Carrier 1 at the same time. That is, the UE 115 may use both RF chains to perform a transmission on Carrier 2 and zero RF chains on carrier 1 at the same time (e.g., the UE 115 may not support simultaneous transmissions on both carriers).

The UE 115 may dynamically switch between Case 1 and Case 2. Stated alternatively, the UE 115 may TDM between antenna ports or transmit chains according to Case 1 and Case 2. In some examples, the UE 115 may receive RRC signaling (e.g., an RRC reconfiguration) that indicates whether the UE 115 is to use Case 1 or Case 2 for uplink transmissions. Although two cases for two RF chains are shown in Table 1, it is to be understood that a UE 115 as described herein may support any quantity of RF chains over any quantity of component carriers. The UE 115 may be configured with multiple cases that may be the same as or different than Case 1 and Case 2 shown in Table 1 for switching RF chains between multiple component carriers for uplink communication.

In the example of FIG. 3, the UE 115 may transmit one or more uplink messages on Carrier 1 in each of the slots zero through four. The UE 115 may use at most a single RF chain and a single antenna port (e.g., rank 1 transmissions) on Carrier 1. The UE 115 may be scheduled to transmit one or more uplink messages on Carrier 2 in slots four, eight, and nine. If the UE 115 operates according to Case 1, the UE 115 may transmit the uplink messages on Carrier 1 using a first RF chain, and the UE 115 may transmit the uplink messages in slots four, eight, and nine on Carrier 2 using a second RF chain. In the example of Case 1, transmissions on both of Carrier 1 and Carrier 2 may thereby be transmitted in a TDM manner using a single RF chain on each carrier. If the UE 115 operates according to Case 2, the UE 115 may switch the first RF chain between carriers. For example, the UE 115 may transmit the uplink messages on Carrier 1 using the first RF chain until the UE 115 has data to transmit on Carrier 2, at which point the UE 115 may switch the first RF chain to Carrier 2. The UE 115 may transmit one or more uplink messages in an FDM or TDM manner on Carrier 2 using both the first and second RF chains in slots four, eight, and nine. The UE 115 may refrain from transmitting on Carrier 1 when the UE 115 transmits on Carrier 2 during communications according to Case 2 (e.g., the UE 115 may use zero RF chains on Carrier 1). The UE 115 may switch the first RF chain back to Carrier 1 after performing the transmissions in each slot.

In some examples, the UE 115 may receive one or more signals that indicate or schedule transmission of two different types of uplink channels in overlapping time resources. For example, the one or more signals may schedule a PUCCH that at least partially overlaps with a PUSCH, or some other types of uplink channels. As described herein, the UE 115 may support concurrent transmission of different types of uplink channels, such as a PUSCH and a PUCCH, on separate component carriers. In some cases, however, a first signal of the one or more signals may indicate a single antenna port for transmitting a PUCCH and a second signal of the one or more signals may indicate up to two antenna ports for transmitting one or more PUSCHs in overlapping time resources (e.g., in a same slot). The PUCCH and the PUSCHs may be scheduled on Carrier 1 or Carrier 2, or some other component carrier. The UE 115 may be configured with two RF chains and may not be able to support simultaneous transmission of the PUCCH using one RF chain and the PUSCH using up to two RF chains (e.g., up to three RF chains).

Techniques described herein provide for the UE 115 to override one or more parameters to reduce a quantity of RF chains for transmission, such that the UE 115 may concurrently transmit the two uplink channels using the available RF chains at the UE 115. For example, the UE 115 may override a scheduled rank, a scheduled precoder, or some other scheduling parameters to reduce a total quantity antenna ports for transmission of both uplink messages to a quantity that is less than or the same as a quantity of available RF chains at the UE 115. The UE 115 may, in some cases, perform uplink switching as described with reference to Table 1 and FIG. 3 to transmit the uplink messages after reducing the quantity of antenna ports. Methods for reducing the quantity of antenna ports and RF chains are described in further detail with reference to FIGS. 5-7.

Figure 4:
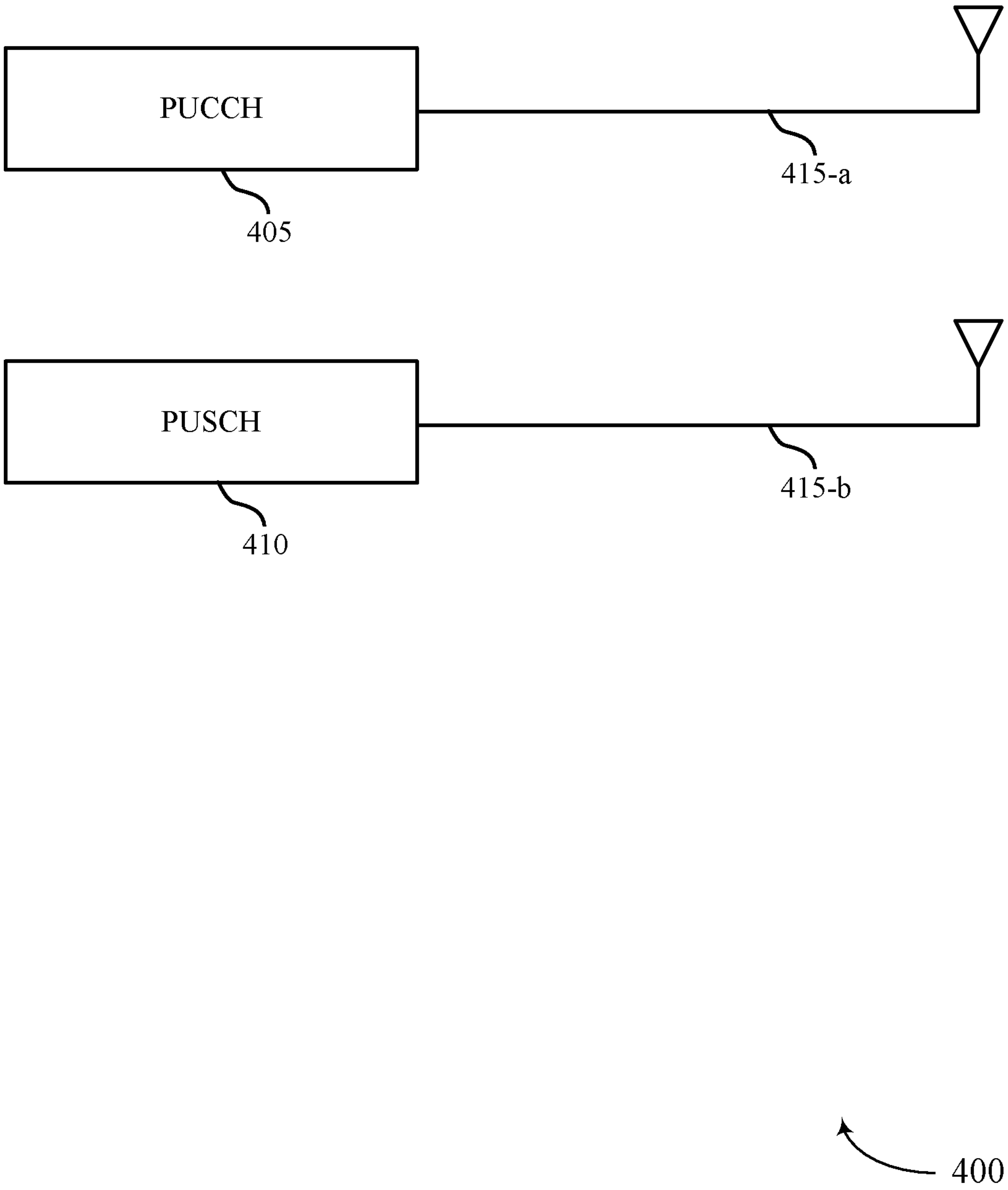
FIGS. 4-7 illustrate examples of antenna port configurations that support uplink switching for concurrent transmissions in accordance with aspects of the present disclosure.

FIG. 4 illustrates an example of an antenna port configuration 400 that supports uplink switching for concurrent transmissions in accordance with aspects of the present disclosure. The antenna port configuration 400 may implement or be implemented by aspects of the wireless communications systems 100 and 200 as described with reference to FIGS. 1 and 2. For example, the antenna port configuration 400 may illustrate a configuration of antenna ports and RF chains 415 at a UE 115, which may represent an example of a UE 115 as described with reference to FIGS. 1-3. The UE 115 may use the antenna port configuration 400 to perform uplink communications with a base station 105, which may represent an example of a base station 105 as described with reference to FIGS. 1-3.

The RF chains 415-*a* and 415-*b* may be configured at the UE 115. The RF chains 415 may include or may correspond to circuitry configured to generate and transmit a signal from the UE 115. Each RF chain 415 may include or be associated with (e.g., mapped to) an antenna port at the UE 115. In the example of FIG. 4, the UE 115 may transmit a PUCCH 405 (e.g., a first uplink message transmitted via a PUCCH or some other uplink channel) and a PUSCH 410 (e.g., a second uplink message transmitted via a PUSCH or some other uplink channel) via one or more resources that are at least partially overlapping in time. The UE 115 may use the first RF chain 415-*a* to transmit the PUCCH 405 and the second RF chain 415-*b* to transmit the PUSCH 410.

The UE 115 may receive one or more signals from a base station 105 that schedule the overlapping PUCCH 405 and PUSCH 410. The one or more signals may be, for example, control messages or other signals, and each signal may indicate transmission of one of the PUCCH 405 or the PUSCH 410. The one or more signals may indicate a first set of one or more parameters for transmitting the PUCCH 405 and a second set of one or more parameters for transmitting the PUSCH 410, as described with reference to FIG. 2. The first set of parameters may indicate or include a first quantity of antenna ports for transmitting the PUCCH 405 and the second set of parameters may indicate or include a second quantity of antenna ports for transmitting the PUSCH 710. For example, the signals may indicate a single transmission layer for transmitting each message (e.g., rank 1), the signals may indicate a respective precoder for transmitting each message that is associated with a single transmit chain, the signals may indicate a single antenna port for transmitting each uplink message, or any combination thereof. In the example of FIG. 4, the PUCCH 405 and the PUSCH 410 may each be scheduled as rank 1 transmissions with a first precoder (e.g., $[0,1]^T$) that indicates the UE 115 is to use a single RF chain 415 for transmitting an uplink message on each respective channel.

The first and second sets of parameters may thereby indicate, to the UE 115, that the PUCCH 405 and the PUSCH 410 may be transmitted using a total of two antenna ports. That is, a sum of the first quantity of antenna ports for transmission of the PUCCH 405 and the second quantity of antenna ports for transmission of the PUSCH 410 may be two. The UE 115 may be configured with the two available RF chains 415-*a* and 415-*b*, such that each RF chain 415 may map to a respective antenna port of the two antenna ports. The UE 115 may thereby transmit the PUCCH 405 and the PUSCH 410 according to the set of one or more scheduling parameters and using the RF chains 415-*a* and 415-*b*, respectively.

Although two RF chains 415 are illustrated in FIG. 4, it is to be understood that a UE 115 as described herein may support any quantity of RF chains 415. The UE 115 may receive one or more signals indicating respective sets of parameters for transmission of any quantity of two or more uplink messages (e.g., uplink messages via a PUSCH, a PUCCH, another type of uplink channel, or any combination thereof) that are at least partially overlapping in time. If the sets of parameters indicate a total quantity, M, of antenna ports that is less than or the same as the quantity, N, of available RF chains 415 at the UE 115 at a given time (e.g., M N), the UE 115 will transmit the two or more uplink messages concurrently in accordance with the respective sets of parameters. For example, the UE 115 will transmit the two or more uplink messages using a quantity of RF chains 415 that is the same as the total quantity of antenna ports indicated via the sets of parameters.

In some cases, the sets of parameters may indicate a total quantity of antenna ports that is greater than the quantity of available RF chains 415 at the UE 115 (e.g., $M>N$). In such cases, the UE 115 may not be able to support concurrent transmission of the two or more uplink messages in accordance with the sets of parameters. Techniques are described herein, including with reference to FIGS. 5-7, for the UE 115 to override at least one parameter of one or more sets of parameters when a scheduled quantity of antenna ports exceeds an available quantity of RF chains 415. The UE 115 may thereby perform concurrent transmission of the two or more uplink messages using a quantity of antenna ports and RF chains 415 that is less than the total quantity indicated via the parameters.

Figure 5:
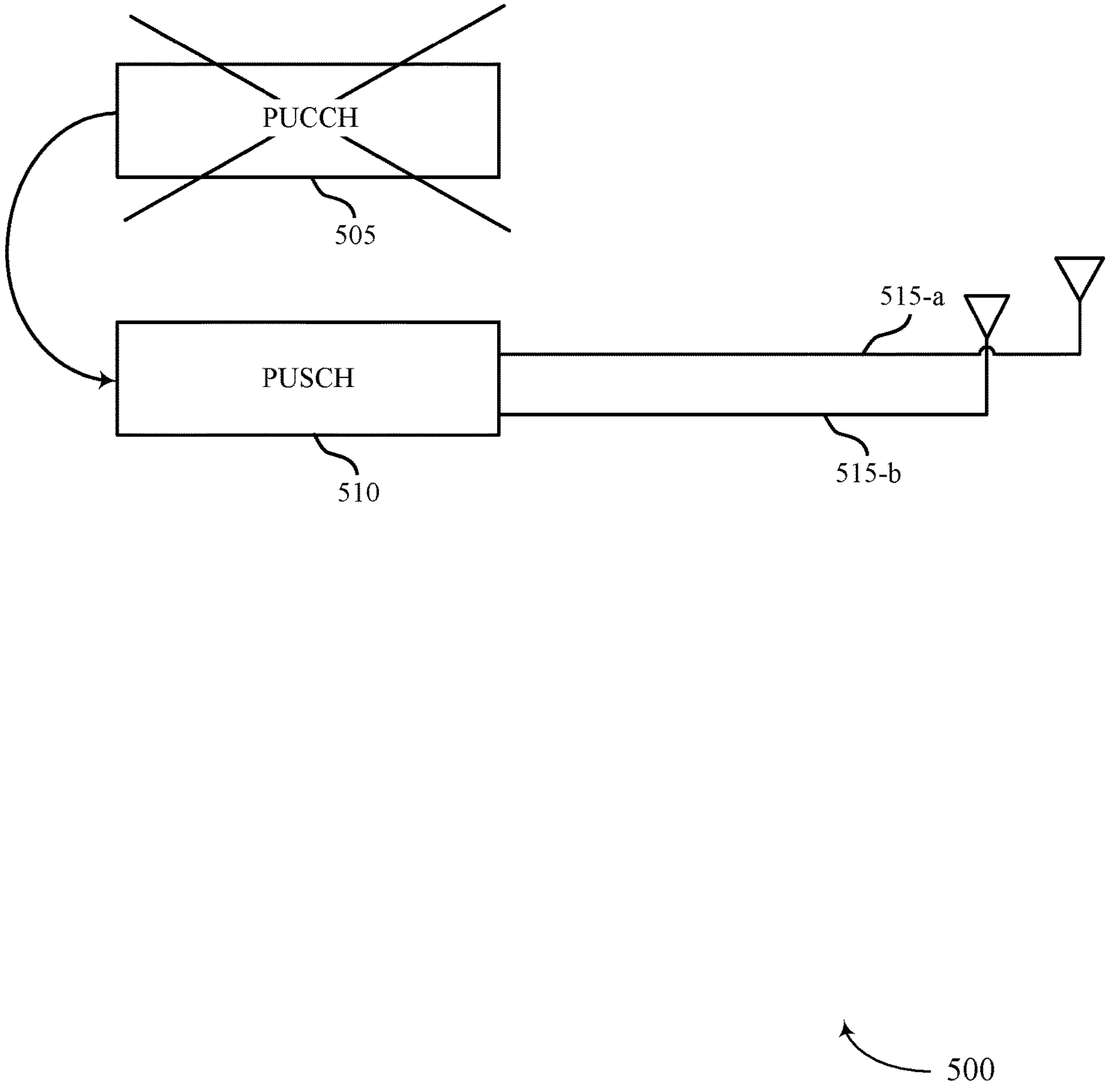

FIG. 5 illustrates an example of an antenna port configuration 500 that supports uplink switching for concurrent transmissions in accordance with aspects of the present disclosure. The antenna port configuration 500 may implement or be implemented by aspects of the wireless communications systems 100 and 200 as described with reference to FIGS. 1 and 2. For example, the antenna port configuration 500 may illustrate a configuration of antenna ports and RF chains 515 at a UE 115, which may represent an example of a UE 115 as described with reference to FIGS. 1-4. The UE 115 may use the antenna port configuration 500 to perform uplink communications with a base station 105, which may represent an example of a base station 105 as described with reference to FIGS. 1-4.

The RF chains 515-*a* and 515-*b* may be configured at the UE 115 and may be examples of the RF chains 415 as described with reference to FIG. 4. The RF chains 515 may include or may correspond to circuitry configured to generate and transmit a signal from the UE 115. Each RF chain 515 may, at any given time, include or be associated with (e.g., mapped to) a single antenna port at the UE 115. In the example of FIG. 5, the UE 115 may use the first transmit chain 515-*a* and the second transmit chain 515-*b* to transmit a first uplink message and a second uplink message that are scheduled to be transmitted via the PUCCH 505 and the PUSCH 510, respectively, in resources that overlap in time.

In some examples, the PUCCH 505, a carrier that conveys the PUCCH 505, or both may be configured to support up to one antenna port. For example, the PUCCH 505 may be configured to support rank 1 transmissions using a single antenna port. The PUSCH 510 may, in some examples, be configured to support more antenna port than the PUCCH 505. For example, the PUSCH 510 may be configured to support rank 1 or rank 2 transmissions, and the PUSCH 510 may support any quantity of antenna ports for each rank.

The UE 115 may receive one or more signals from a base station 105 that schedules the overlapping PUCCH 505 and PUSCH 510. The one or more signals may be, for example, control messages or other signals, and each signal may indicate transmission of one of the PUCCH 505 or the PUSCH 510. The one or more signals may indicate a first set of one or more parameters for transmitting the PUCCH 505 and a second set of one or more parameters for transmitting the PUSCH 510, as described with reference to FIG. 2. The first set of one or more parameters may include or indicate a first quantity of antenna ports for transmission of the PUCCH 505 and the second set of one or more parameters may include or indicate a second quantity of antenna ports for transmission of the PUSCH 510. In the example of FIG. 5, a sum of the first quantity of antenna ports and the second quantity of antenna ports may be greater than a quantity of available RF chains 515 at the UE 115 (e.g., greater than two).

In one example, the second set of parameters may indicate a first rank for transmission of the PUSCH 510 that is associated with a single transmission layer (e.g., rank 1) and an uplink precoder for transmission of the PUSCH 510 that indicates the UE 115 is to use two antenna ports for transmission of the PUSCH 510 (e.g., a precoder such as $[1,1]^T$). Additionally, or alternatively, the second set of parameters may indicate a second rank for transmission of the PUSCH 510 that is associated with two transmission layers (e.g., rank 2). The UE 115 may use one antenna port for transmitting each transmission layer. In either case, the UE 115 may determine to use two antenna ports for transmission of the PUSCH 510 based on the second set of parameters. The first set of parameters may indicate one antenna port for transmission of the PUCCH 505. The UE 115 may thus determine to use a total of three antenna ports for transmission of the PUCCH 505 and the PUSCH 510 in overlapping time resources based on the first and second sets of parameters. However, the UE 115 may support two RF chains 515-*a* and 515-*b*.

As described herein, the UE 115 may be configured to override at least one parameter of the first set of parameters, the second set of parameters, or both to reduce a total quantity of RF chains 515 and antenna ports for transmission of the at least partially overlapping uplink messages. The UE 115 may reduce the total quantity of antenna ports and RF chains 515 to a third quantity that is the same as or less than a quantity of available RF chains 515 at the UE 115. The UE 115 may override the total of three antenna ports indicated via the first and second sets of parameters to two antenna ports for transmission of the PUCCH 505 and the PUSCH 510. The UE 115 may use the available RF chains 515-*a* and 515-*b* and the two antenna ports to transmit the PUCCH 505 and the PUSCH 510, respectively.

In the example of FIG. 5, the UE 115 may be configured to drop the PUCCH 505 and multiplex a payload of the first uplink message scheduled via the PUCCH 505 with the second uplink message scheduled via the PUSCH 510 to reduce the quantity of antenna ports. The UE 115 may transmit the second uplink message and the payload of the first uplink message via the PUSCH 510 using the RF chain 515-*a* and the RF chain 515-*b*. The UE 115 may transmit the first and second uplink messages via the PUSCH 510 using uplink switching techniques, as described with reference to FIG. 3.

The UE 115 may thereby transmit, to a base station 105, a first uplink control message and a second uplink data message via the PUSCH 510 that at least partially overlap in time based on a third set of parameters that overrides at least one parameter of the first and second sets of parameters associated with the first and second uplink messages and indicated to the UE 115 via the one or more signals from the base station 105. The UE 115 may override the at least one parameter to reduce a scheduled quantity of antenna ports for transmission of both the messages to a total quantity that is less than a quantity of available RF chains 515 at the UE 115, which may provide for the UE 115 to transmit the uplink messages concurrently with reduced latency, improved throughput, and improved communication reliability.

Although two RF chains 515-*a* and 515-*b* and two uplink messages are illustrated in FIG. 5, it is to be understood that the UE 115 may multiplex payloads of any quantity of one or more uplink messages and transmit the uplink messages using any quantity of available RF chains 515 at the UE 115. The UE 115 may thereby override parameters for any quantity of uplink messages that are scheduled to overlap in time to perform the transmissions with a reduced quantity of RF chains 515.

Figure 6:
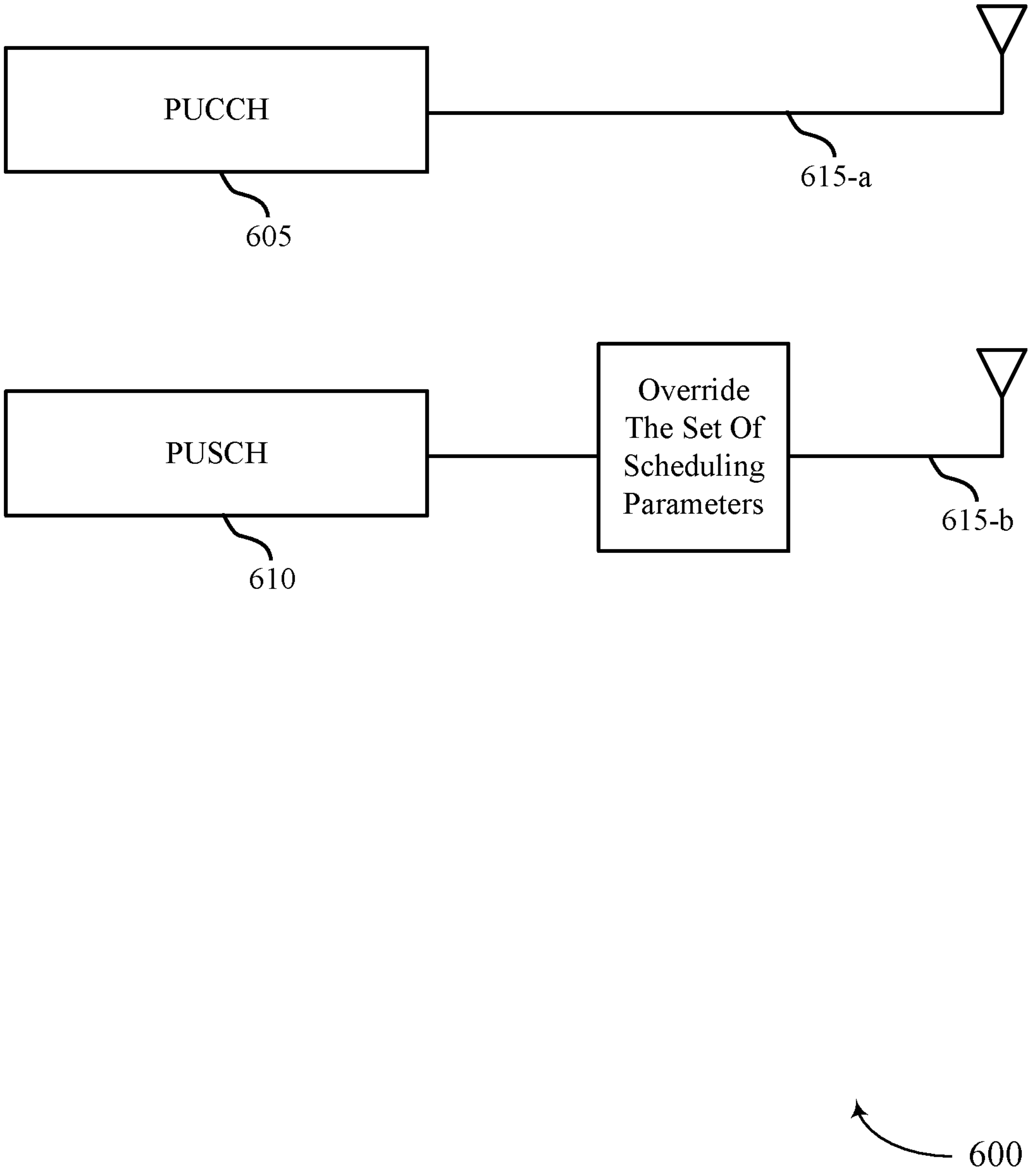

FIG. 6 illustrates an example of an antenna port configuration 600 that supports uplink switching for concurrent transmissions in accordance with aspects of the present disclosure. The antenna port configuration 600 may implement or be implemented by aspects of the wireless communications systems 100 and 200 as described with reference to FIGS. 1 and 2. For example, the antenna port configuration 600 may illustrate a configuration of antenna ports and RF chains 615 at a UE 115, which may represent an example of a UE 115 as described with reference to FIGS. 1-5. The UE 115 may use the antenna port configuration 600 to perform uplink communications with a base station 105, which may represent an example of a base station 105 as described with reference to FIGS. 1-5.

The RF chains 615-*a* and 615-*b* may be configured at the UE 115 and may be examples of the RF chains 415 and 515 described with reference to FIGS. 4 and 5. The RF chains 615 may include or may correspond to circuitry configured to generate and transmit a signal from the UE 115. Each RF chain 615 may, at any given time, include or be associated with (e.g., mapped to) an antenna port at the UE 115 for a respective transmission. In the example of FIG. 6, the UE 115 may transmit a PUCCH 605 (e.g., a first uplink message transmitted via a PUCCH or some other uplink channel) and a PUSCH 610 (e.g., a second uplink message transmitted via a PUSCH or some other uplink channel) via one or more resources that are at least partially overlapping in time. The UE 115 may use the first transmit chain 615-*a* to transmit the PUCCH 605 and the second transmit chain 615-*b* to transmit the PUSCH 610.

In some examples, the PUCCH 605, a carrier that conveys the PUCCH 605, or both may be configured to support up to one antenna port. For example, the PUCCH 605 may be configured to support rank 1 transmissions using a single antenna port. The PUSCH 610 may, in some examples, be configured to support more antenna ports than the PUCCH 605. For example, the PUSCH 610 may be configured to support rank 1 or rank 2 transmissions, and the PUSCH 610 may support any quantity of antenna ports for each rank.

The UE 115 may receive one or more signals from a base station 105 that schedule or indicate the overlapping PUCCH 605 and PUSCH 610. The one or more signals may indicate a first set of one or more parameters for transmitting the PUCCH 605 and a second set of one or more parameters for transmitting the PUSCH 610, as described with reference to FIG. 2. In the example of FIG. 6, a sum of a first quantity of antenna ports indicated by the first set of parameters and a second quantity of antenna ports indicated by the second set of parameters that may be greater than a quantity of available RF chains 615 at the UE 115 at the time of the scheduled transmissions (e.g., three antenna ports, or some other quantity of antenna ports).

In one example, the second set of parameters may indicate a first rank for transmission of the PUSCH 610 that is associated with a single transmission layer (e.g., rank 1) and an uplink precoder for transmission of the PUSCH 610 that indicates the UE 115 is to use two antenna ports for transmission of the PUSCH 610 (e.g., a precoder such as $[1,1]^T$). Additionally, or alternatively, the second set of parameters may indicate a second rank for transmission of the PUSCH 610 that is associated with two transmission layers (e.g., rank 2). In either case, the second set of parameters may indicate that the UE 115 is scheduled to use two antenna ports for transmissions of the PUSCH 610. The first set of parameters may indicate a first rank associated with a single transmission layer and a first precoder that indicates the UE 115 is to use a single antenna port for transmission of the PUCCH 605 in overlapping time resources. In such cases, a sum of the first and second quantities of antenna ports may be three. However, the UE 115 may be configured with two RF chains 615.

As described herein, the UE 115 may be configured to override at least one parameter of the first set of parameters or the second set of parameters to reduce a total quantity of RF chains 615 and antenna ports for transmission of the at least partially overlapping uplink messages. The UE 115 may reduce the total quantity of antenna ports and RF chains 615 to a third quantity that is the same as or less than a quantity of available RF chains 615 at the UE 115 at the time of the scheduled uplink transmissions. The UE 115 may override the three or more antenna ports indicated via the combination of the first set of parameters and the second set of parameters to a total of two antenna ports for transmission of both the PUCCH 605 and the PUSCH 610. The UE 115 may use the available RF chains 615-*a* and 615-*b* and the two antenna ports to transmit the PUCCH 605 and the PUSCH 610, respectively.

In the example of FIG. 6, the UE 115 may override one or more parameters of the second set of parameters associated with transmission of the PUSCH 610. The UE 115 may override a scheduled rank for transmitting the PUSCH 610, a scheduled precoder for transmitting the PUSCH 610, or both. For example, if the second set of parameters indicates a second rank for transmitting the PUSCH 610 that is associated with two transmission layers, the UE 115 may determine to transmit the PUSCH 610 using a single layer to reduce antenna ports. The UE 115 may thereby transmit the PUSCH 610 using a rank and corresponding second quantity of transmission layers that override a scheduled rank (e.g., from a rank 2 transmission to a rank 1 transmission). Additionally, or alternatively, the set of scheduling parameters may indicate a precoder for transmitting the PUSCH 610 that is associated with two antenna ports (e.g., $[1,1]^T$). The UE 115 may determine or derive a different precoder that overrides the scheduled precoder. For example, the second set of parameters may indicate a second precoder associated with two antenna ports, and the UE 115 may transmit the PUSCH 610 according to a third precoder that overrides the second precoder and is associated with a single antenna port (e.g., [0,1]T).

The UE 115 may thereby transmit the PUCCH 605 using a first quantity of antenna ports (e.g., one in the example of FIG. 6) based on a first uplink precoder indicated via the first set of parameters, and the UE 115 may transmit the PUSCH 610 using a subset of the second quantity of antenna ports (e.g., a single antenna port) based on a third uplink precoder that overrides a second uplink precoder indicated via the second set of parameters. A sum of the first quantity of antenna ports used to transmit the PUCCH 605 and the subset of antenna ports used to transmit the PUSCH 610 may be the same as or less than a quantity of available RF chains 615 at the UE 115 (e.g., two). For example, the UE 115 may transmit the PUCCH 605 using the RF chain 615-*a* and the PUSCH 610 using the RF chain 615-*b* in overlapping time resources and on separate component carriers in accordance with a third set of parameters.

Although two RF chains 615-*a* and 615-*b* and two uplink messages are illustrated in FIG. 6, it is to be understood that the UE 115 may be configured with any quantity of RF chains 615 and may perform the described techniques for any quantity of one or more uplink messages that are scheduled to overlap in time. The UE 115 may thereby override one or more parameters for any quantity of uplink messages that are scheduled to overlap in time to perform the transmissions with a reduced quantity of RF chains 615. By overriding the parameters, the UE 115 may reduce a scheduled quantity of antenna ports for transmission of the uplink messages to a quantity that is the same as or less than a quantity of available RF chains 615 at the UE 115, which may provide for the UE 115 to transmit the uplink messages with reduced latency, improved throughput, and improved communication reliability.

Figure 7:
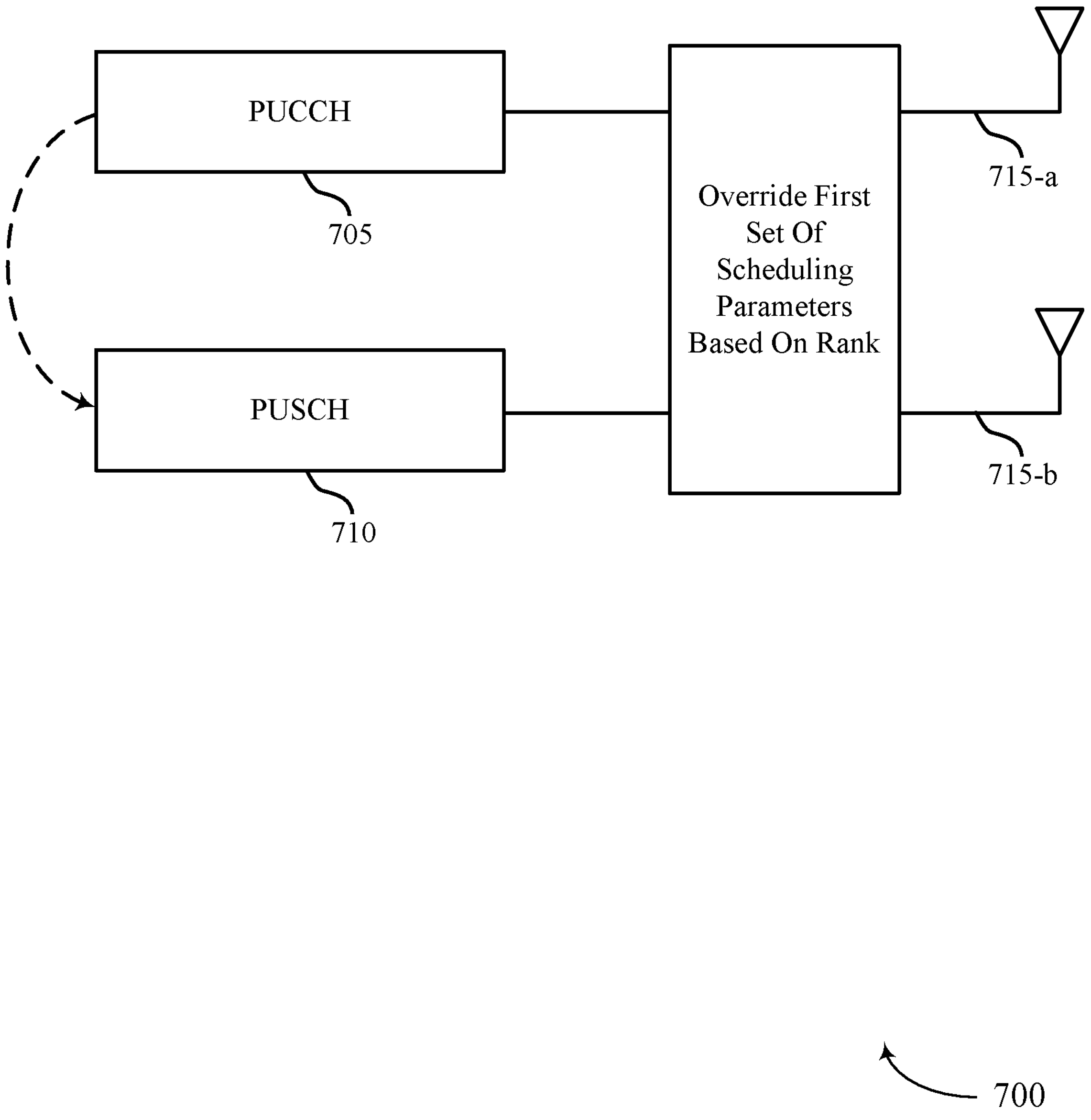

FIG. 7 illustrates an example of an antenna port configuration 700 that supports uplink switching for concurrent transmissions in accordance with aspects of the present disclosure. The antenna port configuration 700 may implement or be implemented by aspects of the wireless communications systems 100 and 200 as described with reference to FIGS. 1 and 2. For example, the antenna port configuration 700 may illustrate a configuration of antenna ports and RF chains 715 at a UE 115, which may represent an example of a UE 115 as described with reference to FIGS. 1-6. The UE 115 may use the antenna port configuration 700 to perform uplink communications with a base station 105, which may represent an example of a base station 105 as described with reference to FIGS. 1-6.

The RF chains 715-*a* and 715-*b* may be configured at the UE 115 and may be examples of the RF chains 415, 515, and 615 described with reference to FIGS. 4-6. The RF chains 715 may include or may correspond to circuitry configured to generate and transmit a signal from the UE 115. Each RF chain 715 may, at any given time, include or be associated with (e.g., mapped to) an antenna port at the UE 115 for transmission of a respective signal. In the example of FIG. 7, the UE 115 may transmit a PUCCH 705 (e.g., a first uplink message transmitted via a PUCCH or some other uplink channel) and a PUSCH 710 (e.g., a second uplink message transmitted via a PUSCH or some other uplink channel) via one or more resources that are at least partially overlapping in time. The UE 115 may use the first transmit chain 715-*a* to transmit the PUCCH 705 and the second transmit chain 715-*b* to transmit the PUSCH 710 in accordance with the antenna port reduction techniques described herein.

In some examples, the PUCCH 705, a carrier that conveys the PUCCH 705, or both may be configured to support up to one antenna port. For example, the PUCCH 705 may be configured to support rank 1 transmissions using a single antenna port. The PUSCH 710 may, in some examples, be configured to support more antenna ports than the PUCCH 705. For example, the PUSCH 710 may be configured to support rank 1 or rank 2 transmissions, and the PUSCH 710 may support any quantity of antenna ports for each rank.

The UE 115 may receive one or more signals from a base station 105 that schedule the overlapping PUCCH 705 and PUSCH 710. The one or more signals may indicate a first set of one or more parameters for transmitting the PUCCH 705 and a second set of one or more parameters for transmitting the PUSCH 710, as described with reference to FIG. 2. The first set of one or more scheduling parameters may indicate or include a first quantity of antenna ports for transmission of the PUCCH 705 and the second set of one or more parameters may indicate or include a second quantity of antenna ports for transmission of the PUSCH 710. In the example of FIG. 7, a sum of the first quantity and the second quantity may be greater than a quantity of available RF chains 715 at the UE 115 at the time of the scheduled transmissions (e.g., three antenna ports, or some other quantity of antenna ports).

In one example, the second set of one or more parameters may indicate a first rank for transmission of the PUSCH 710 that is associated with a single transmission layer (e.g., rank 1) and an uplink precoder for transmission of the PUSCH 710 that indicates the UE 115 is to use two antenna ports for transmission of the PUSCH 710 (e.g., a precoder such as $[1,1]^T$). Additionally, or alternatively, the second set of one or more parameters may indicate a second rank for transmission of the PUSCH 710 that is associated with two transmission layers (e.g., rank 2). In either case, the second set of parameters may indicate that the UE 115 is scheduled to use two antenna ports for transmissions of the PUSCH 710. The first set of parameters may indicate one antenna port for transmission of the PUCCH 705. That is, the first and second sets of parameters may indicate a total of three antenna ports for transmission of the PUCCH 705 and the PUSCH 710 in overlapping time resources. However, the UE 115 may be configured with the two available RF chains 715-*a* and 715-*b*.

As described herein, the UE 115 may be configured to override at least one parameter of the first set of parameters, the second set of parameters, or both to reduce a total quantity of RF chains 715 and antenna ports for transmission of the at least partially overlapping uplink messages. The UE 115 may reduce the total quantity of antenna ports and RF chains 715 indicated via the parameters to a quantity that is the same as or less than a quantity of available RF chains 715 at the UE 115 at the time of the scheduled uplink transmissions. The UE 115 may override the three antenna ports indicated via the combination of the first and second sets of parameters to two antenna ports for transmission of both a first uplink message via the PUCCH 705 and a second uplink message via the PUSCH 710. The UE 115 may use the available RF chains 715-*a* and 715-*b* and the two antenna ports to transmit the PUCCH 705 and the PUSCH 710, respectively.

In the example of FIG. 7, the UE 115 may be configured to override one or more parameters based on a scheduled rank for transmission of the second uplink message via the PUSCH 710 as indicated via the second set of parameters. For example, if the rank indicated via the second set of parameters is greater than or equal to a threshold rank, the UE 115 may multiplex a payload of the PUCCH 705 with the PUSCH 710 transmission, as described with reference to FIG. 5. If the rank indicated via the second set of parameters is less than the threshold rank, the UE 115 may override a precoder indicated via the second set of parameters to reduce a quantity of antenna ports for transmission of the PUSCH 710. For example, the UE 115 may transmit the PUSCH 710 using a third uplink precoder that overrides a second uplink precoder indicated via the second set of parameters and that is associated with fewer antenna ports than the second uplink precoder, as described with reference to FIG. 6.

In the example of FIG. 7, the threshold rank may be two. If the PUSCH 710 is scheduled with a first rank that is less than the threshold rank of two (e.g., a rank 1 precoder), the UE 115 may override a scheduled precoder for transmission of the PUSCH 710. For example, the UE 115 may override a precoder that is associated with two antenna ports (e.g., $[1,1]^T$), and the UE 115 may transmit the PUSCH 710 using a third precoder associated with a single antenna port (e.g., $[0,1]^T$), as described with reference to FIG. 6. The UE 115 may thereby transmit the first uplink message via the PUCCH 705 using the RF chain 715-*a* and a single antenna port in accordance with a first uplink precoder indicated via the first set of parameters, and the UE 115 may transmit the second uplink message via the PUSCH 710 using the second RF chain 715-*b* and a single antenna port in accordance with a third uplink precoder of the third set of scheduling parameters that overrides a second uplink precoder indicated via the second set of parameters.

If the second set of scheduling parameters indicates a second rank for transmission of the PUSCH 710 that is greater than or equal to the threshold rank and is associated with two or more transmission layers (e.g., a rank 2 precoder), the UE 115 may drop the PUCCH 705 and multiplex a payload of the first uplink message scheduled to be transmitted via the PUCCH 705 with the second uplink message scheduled to be transmitted via the PUSCH 710. The UE 115 may transmit the second uplink message and the payload of the first uplink message via the PUSCH 710 using the first and second RF chains 715-*a* and 715-*b* (e.g., and uplink switching techniques described with reference to FIG. 3). Such payload multiplexing is described in further detail with reference to FIG. 5. The UE 115 may thereby transmit the second uplink message and the payload of the first uplink message via the PUSCH 710 in accordance with a third set of parameters (e.g., a third rank, a third precoder, or one or more other third parameters) that overrides at least one parameter of the first and second sets of parameters indicated by the base station 105. The UE 115 may multiplex the uplink messages if the rank indicated via the second set of parameters is greater than or equal to the threshold rank to reduce power consumption and complexity as compared with scenarios in which the UE 115 may override a scheduled rank and transmit an uplink message using fewer transmission layers than scheduled.

Although two RF chains 715-*a* and 715-*b* and two uplink messages are illustrated in FIG. 7, it is to be understood that the UE 115 may be configured with any quantity of RF chains 715 and may perform the described techniques for any quantity of one or more uplink messages that are scheduled to overlap in time. The uplink messages may be transmitted via the PUCCH 705, the PUSCH 710, or any other type of uplink channel. The UE 115 may thereby override parameters for any quantity of uplink messages that are scheduled to overlap in time based on a scheduled rank of one or more of the uplink messages being greater than or less than a threshold rank. By overriding the parameters, the UE 115 may reduce a scheduled quantity of antenna ports for transmission of the uplink messages to a quantity that is the same as or less than a quantity of available RF chains 715 at the UE 115, which may provide for the UE 115 to transmit the uplink messages with reduced latency, improved throughput, and improved communication reliability.

Figure 8:
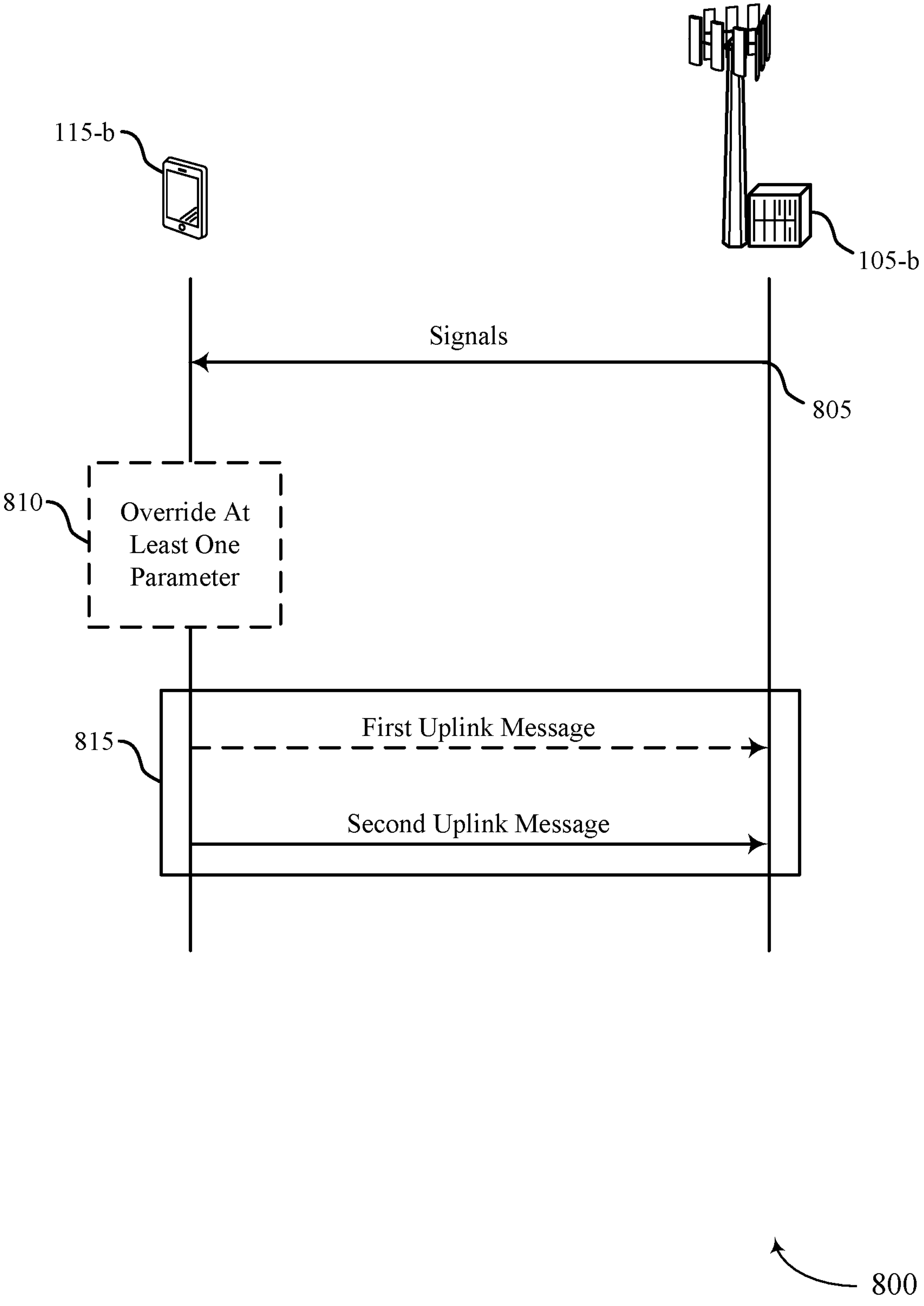
FIG. 8 illustrates an example of a process flow that supports uplink switching for concurrent transmissions in accordance with aspects of the present disclosure.

FIG. 8 illustrates an example of a process flow 800 that supports uplink switching for concurrent transmissions in accordance with aspects of the present disclosure. The process flow 800 may implement or be implemented by aspects of the wireless communications systems 100 and 200. For example, the process flow 800 illustrates communications between a base station 105-*b* and a UE 115-*b*, which may represent examples of a base station 105 and a UE 115 as described with reference to FIGS. 1-7. The UE 115-*b* may be configured to override a set of scheduling parameters for uplink transmission that are received from the base station 105-*b*.

In the following description of the process flow 800, the operations between the base station 105-*b* and the UE 115-*b* may be performed in different orders or at different times. Some operations may also be left out of the process flow 800, or other operations may be added. Although the base station 105-*b* and the UE 115-*b* are shown performing the operations of the process flow 800, some aspects of some operations may also be performed by one or more other wireless devices.

At 805, the base station 105-*b* may transmit one or more signals to the UE 115-*b*. The one or more signals may indicate a first uplink message and a second uplink message that at least partially overlap in time. The first uplink message may be associated with a first set of parameters including a first quantity of antenna ports. The second uplink message may be associated with a second set of parameters including a second quantity of antenna ports.

At 810, in some examples, the UE 115-*b* may determine a third set of parameters that overrides at least one parameter of the first set of parameters or the second set of parameters. For example, one or more parameters of the third set may be different than, and override, one or more parameters of the first or second sets of parameters. The UE 115-*b* may determine the third set of parameters using one or more methods, which are described in further detail with reference to FIGS. 5-7.

At 815, the UE 115-*b* may transmit the first uplink message and the second uplink message to the base station 105-*b* according to the third set of parameters that overrides the at least one parameter of the first set of parameters or the second set of parameters based on a sum of the first quantity of antenna ports and the second quantity of antenna ports being greater than the quantity of available RF chains at the UE 115-*b*. The third set of scheduling parameters may be associated with a third quantity of antenna ports that is less than the sum of the first quantity of antenna ports and the second quantity of antenna ports. The UE 115-*b* may thereby transmit the first uplink message and the second uplink message using the third quantity of antenna ports and the quantity of available RF chains.

In some examples, the UE 115-*b* may transmit the first uplink message and the second uplink message by multiplexing a payload of the first uplink message with the second uplink message, as described with reference to FIG. 5. The UE 115-*b* may transmit the second uplink message and the payload of the first uplink message in accordance with the third quantity of antenna ports based on the third set of parameters, where the third quantity of antenna ports may be the same as the second quantity of antenna ports that is associated with the second uplink message.

In some examples, the UE 115-*b* may transmit the first uplink message using the first quantity of antenna ports and the second uplink message using a subsets of one or more antenna ports of the second quantity of antenna ports, as described with reference to FIGS. 6 and 7. The subset may be based on the third set of parameters. For example, the UE 115-*b* may transmit the second uplink message using the subset of one or more antenna ports of the second quantity of antenna ports based on a third uplink precoder of the third set of parameters that overrides a second uplink precoder indicated via the second set of parameters. Additionally or alternatively, the UE 115-*b* may transmit the second uplink message using a second quantity of transmission layers based on the third set of parameters overriding the second set of parameters, where the second set of parameters may indicate a rank associated with a first quantity of transmission layers that is greater than the second quantity of transmission layers.

Figure 9:
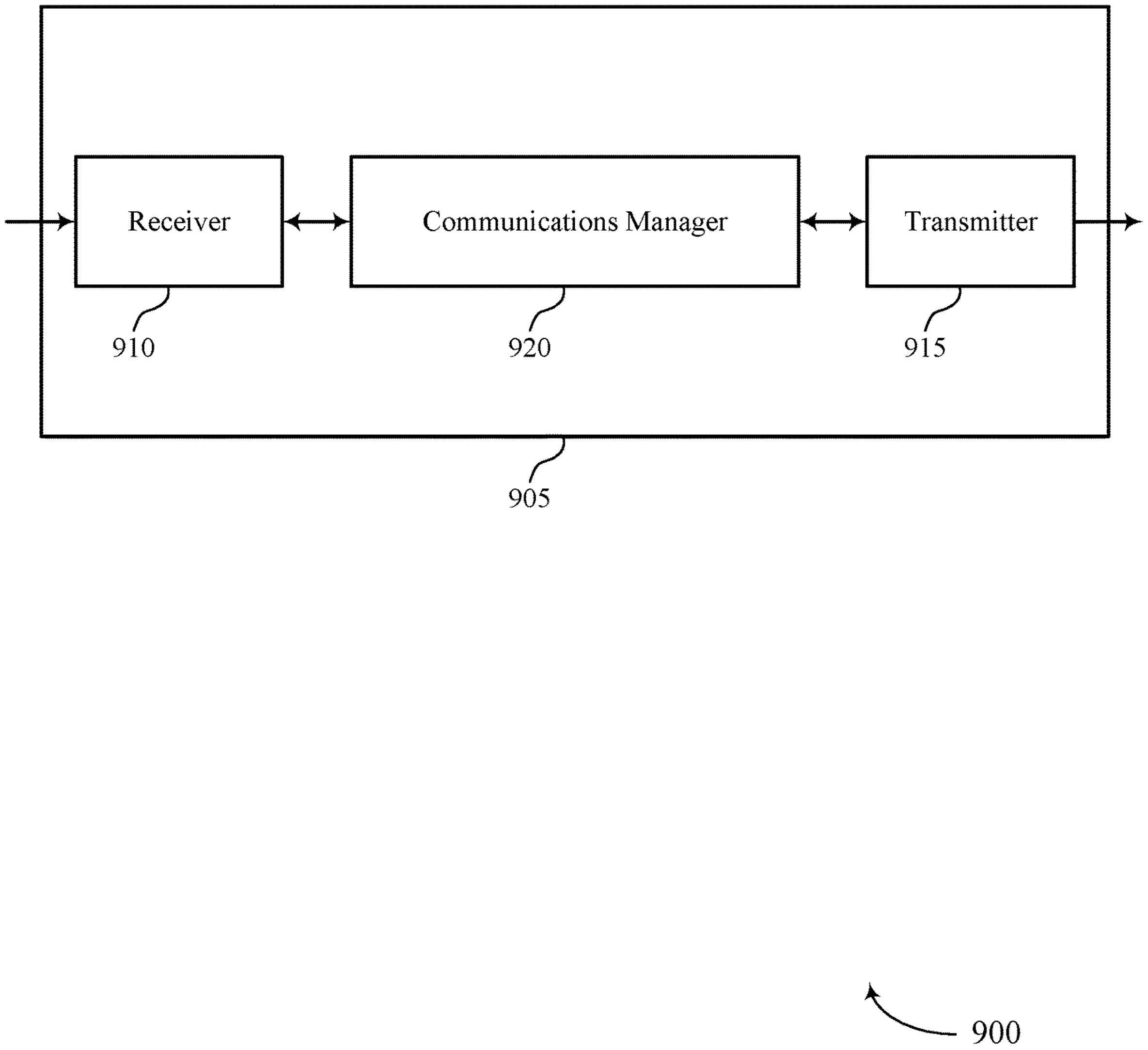
FIGS. 9 and 10 show block diagrams of devices that support uplink switching for concurrent transmissions in accordance with aspects of the present disclosure.

FIG. 9 shows a block diagram 900 of a device 905 that supports uplink switching for concurrent transmissions in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to uplink switching for concurrent transmissions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to uplink switching for concurrent transmissions). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of uplink switching for concurrent transmissions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving one or more signals indicating a first uplink message and a second uplink message that at least partially overlap in time, the first uplink message associated with a first set of parameters including a first quantity of antenna ports, the second uplink message associated with a second set of parameters including a second quantity of antenna ports. The communications manager 920 may be configured as or otherwise support a means for transmitting the first uplink message and the second uplink message according to a third set of parameters that overrides at least one parameter of the first set of parameters or the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, and more efficient utilization of communication resources. By overriding one or more scheduling parameters for transmission of an uplink message, the processor of the device 905 (e.g., a UE 115) may ensure that a quantity of antenna ports for transmitting concurrent uplink messages is the same as or less than a quantity of available RF chains at the device 905, which may improve communication reliability and reduce processing. For example, the processor may refrain from performing retransmissions of the uplink messages or delaying communication.

Figure 10:
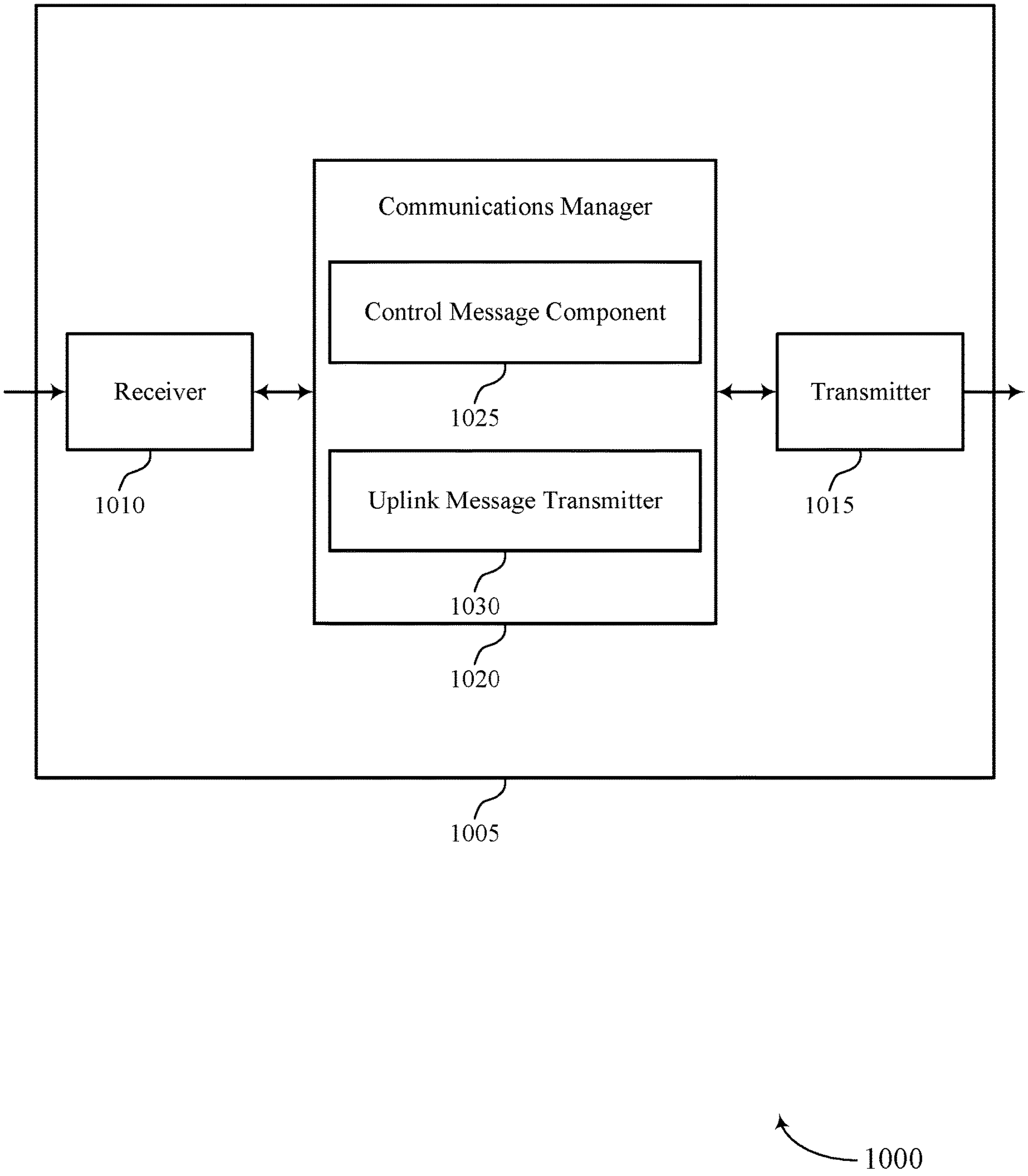

FIG. 10 shows a block diagram 1000 of a device 1005 that supports uplink switching for concurrent transmissions in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to uplink switching for concurrent transmissions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to uplink switching for concurrent transmissions). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of uplink switching for concurrent transmissions as described herein. For example, the communications manager 1020 may include a control message component 1025 an uplink message transmitter 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The control message component 1025 may be configured as or otherwise support a means for receiving one or more signals indicating a first uplink message and a second uplink message that at least partially overlap in time, the first uplink message associated with a first set of parameters including a first quantity of antenna ports, the second uplink message associated with a second set of parameters including a second quantity of antenna ports. The uplink message transmitter 1030 may be configured as or otherwise support a means for transmitting the first uplink message and the second uplink message according to a third set of parameters that overrides at least one parameter of the first set of parameters or the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

Figure 11:
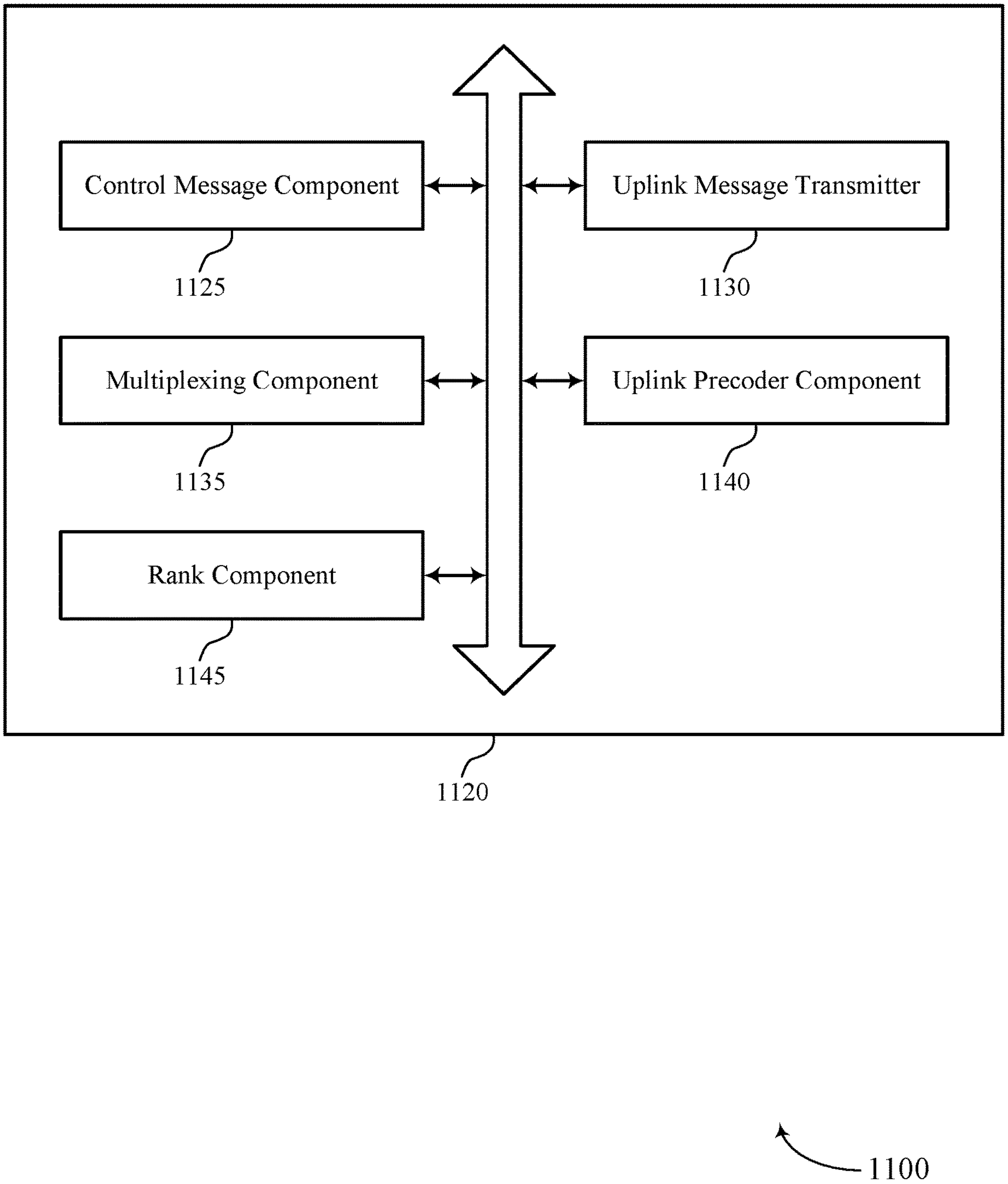
FIG. 11 shows a block diagram of a communications manager that supports uplink switching for concurrent transmissions in accordance with aspects of the present disclosure.

FIG. 11 shows a block diagram 1100 of a communications manager 1120 that supports uplink switching for concurrent transmissions in accordance with aspects of the present disclosure. The communications manager 1120 may be an example of aspects of a communications manager 920, a communications manager 1020, or both, as described herein. The communications manager 1120, or various components thereof, may be an example of means for performing various aspects of uplink switching for concurrent transmissions as described herein. For example, the communications manager 1120 may include a control message component 1125, an uplink message transmitter 1130, a multiplexing component 1135, an uplink precoder component 1140, a rank component 1145, or any combination thereof. Each of these components may communicate, directly or indirectly, with one another (e.g., via one or more buses).

The communications manager 1120 may support wireless communication at a UE in accordance with examples as disclosed herein. The control message component 1125 may be configured as or otherwise support a means for receiving one or more signals indicating a first uplink message and a second uplink message that at least partially overlap in time, the first uplink message associated with a first set of parameters including a first quantity of antenna ports, the second uplink message associated with a second set of parameters including a second quantity of antenna ports. The uplink message transmitter 1130 may be configured as or otherwise support a means for transmitting the first uplink message and the second uplink message according to a third set of parameters that overrides at least one parameter of the first set of parameters or the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

In some examples, to support transmitting the first uplink message and the second uplink message, the multiplexing component 1135 may be configured as or otherwise support a means for multiplexing a payload of the first uplink message with the second uplink message. In some examples, to support transmitting the first uplink message and the second uplink message, the uplink message transmitter 1130 may be configured as or otherwise support a means for transmitting the second uplink message and the payload of the first uplink message based on the multiplexing and in accordance with the third quantity of antenna ports, where the third quantity of antenna ports is the same as the second quantity of antenna ports that is associated with the second uplink message.

In some examples, to support multiplexing the payload of the first uplink message with the second uplink message, the multiplexing component 1135 may be configured as or otherwise support a means for multiplexing the payload of the first uplink message with the second uplink message based on a rank for transmission of the second uplink message being greater than a threshold rank.

In some examples, to support transmitting the first uplink message and the second uplink message, the uplink precoder component 1140 may be configured as or otherwise support a means for transmitting the first uplink message using the first quantity of antenna ports based on a first uplink precoder of the first set of parameters. In some examples, to support transmitting the first uplink message and the second uplink message, the uplink precoder component 1140 may be configured as or otherwise support a means for transmitting the second uplink message using a subset of one or more antenna ports of the second quantity of antenna ports based on a third uplink precoder of the third set of parameters, where the third uplink precoder overrides a second uplink precoder that is indicated via the second set of parameters, and where the third quantity of antenna ports is based on a second sum of the first quantity of antenna ports and a quantity of antenna ports of the subset of one or more antenna ports.

In some examples, to support transmitting the second uplink message, the rank component 1145 may be configured as or otherwise support a means for transmitting the second uplink message using the subset of one or more antenna ports based on a rank for transmission of the second uplink message being less than a threshold rank.

In some examples, to support transmitting the second uplink message, the rank component 1145 may be configured as or otherwise support a means for transmitting the second uplink message using a second quantity of transmission layers based on the third set of parameters overriding the second set of parameters, where the second set of parameters indicates a rank associated with a first quantity of transmission layers that is greater than the second quantity of transmission layers.

In some examples, to support transmitting the first uplink message and the second uplink message, the uplink message transmitter 1130 may be configured as or otherwise support a means for transmitting the first uplink message via a PUCCH. In some examples, to support transmitting the first uplink message and the second uplink message, the uplink message transmitter 1130 may be configured as or otherwise support a means for transmitting the second uplink message via a PUSCH. In some examples, to support transmitting the first uplink message and the second uplink message, the uplink message transmitter 1130 may be configured as or otherwise support a means for transmitting the first uplink message via a first component carrier. In some examples, to support transmitting the first uplink message and the second uplink message, the uplink message transmitter 1130 may be configured as or otherwise support a means for transmitting the second uplink message via a second component carrier.

Figure 12:
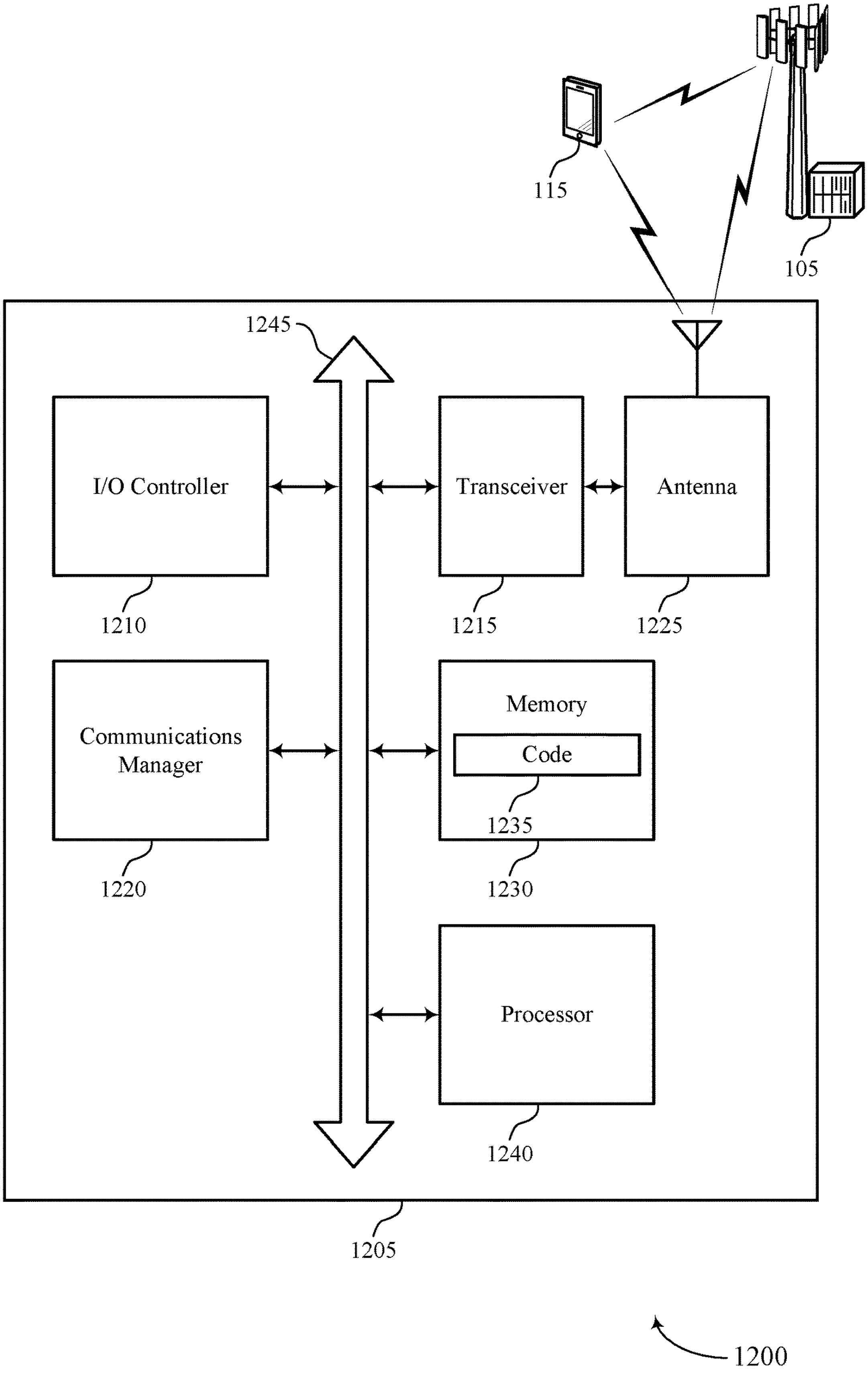
FIG. 12 shows a diagram of a system including a device that supports uplink switching for concurrent transmissions in accordance with aspects of the present disclosure.

FIG. 12 shows a diagram of a system 1200 including a device 1205 that supports uplink switching for concurrent transmissions in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting uplink switching for concurrent transmissions). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving one or more signals indicating a first uplink message and a second uplink message that at least partially overlap in time, the first uplink message associated with a first set of parameters including a first quantity of antenna ports, the second uplink message associated with a second set of parameters including a second quantity of antenna ports. The communications manager 1220 may be configured as or otherwise support a means for transmitting the first uplink message and the second uplink message according to a third set of parameters that overrides at least one parameter of the first set of parameters or the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

By including or configuring the communications manager 1220 in accordance with examples as described herein, the device 1205 may support techniques for improved communication reliability, reduced latency, reduced power consumption, and improved coordination between devices. The device 1205 (e.g., a UE 115) may override a set of one or more scheduling parameters to reduce a total quantity of RF chains for transmitting concurrent uplink messages, which may provide for the device 1205 to successfully transmit the uplink messages in overlapping resources. Such techniques may improve a likelihood of the uplink messages being transmitted successfully, which may improve communication reliability and reduce latency. Additionally, or alternatively, the device 1205 may reduce a total quantity of RF chains for uplink transmission, which may reduce processing, complexity, and power consumption by the device.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of uplink switching for concurrent transmissions as described herein, or the processor 1240 and the memory 1230 may be otherwise configured to perform or support such operations.

Figure 13:
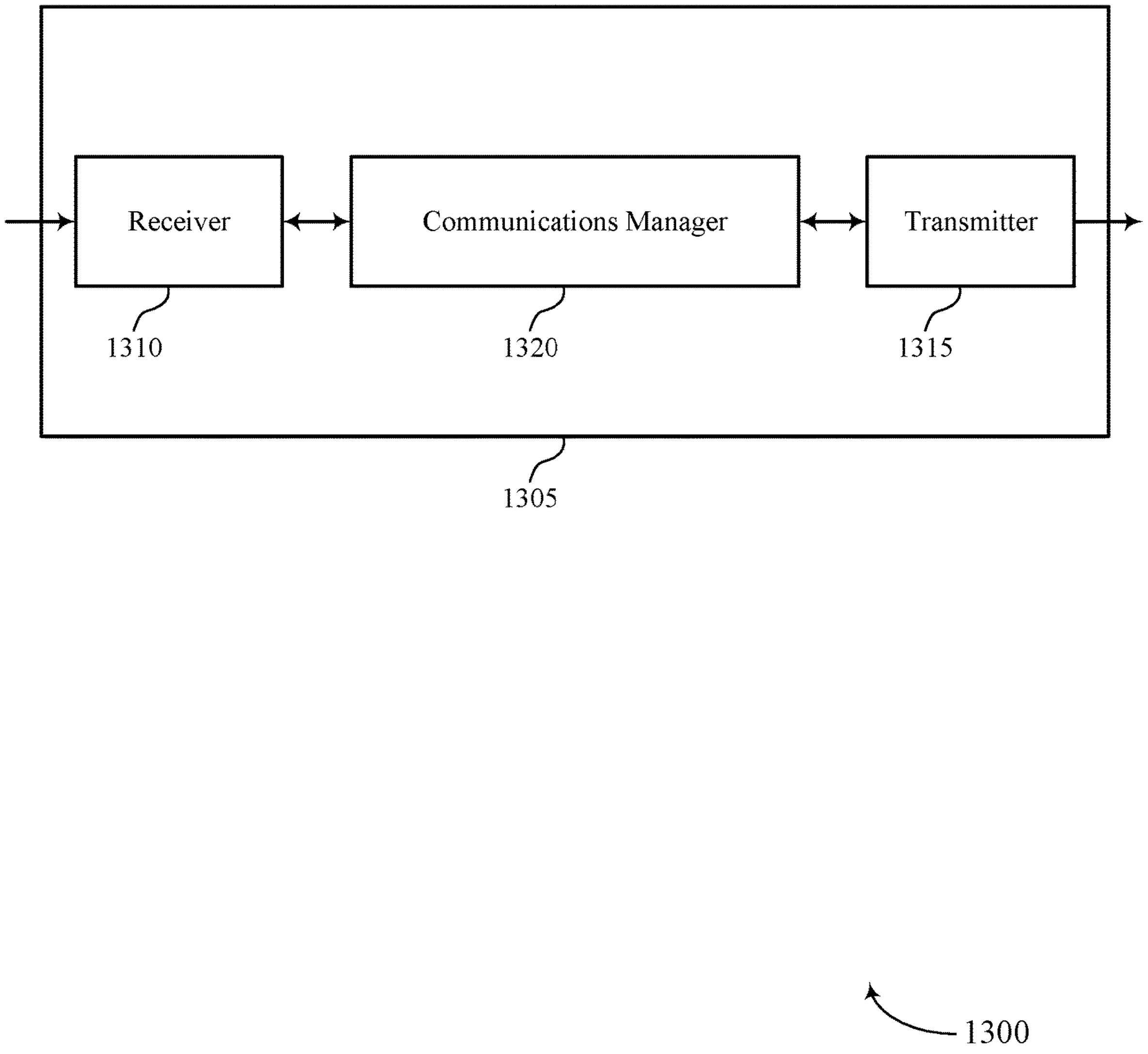
FIGS. 13 and 14 show block diagrams of devices that support uplink switching for concurrent transmissions in accordance with aspects of the present disclosure.

FIG. 13 shows a block diagram 1300 of a device 1305 that supports uplink switching for concurrent transmissions in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to uplink switching for concurrent transmissions). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to uplink switching for concurrent transmissions). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of uplink switching for concurrent transmissions as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. For example, the communications manager 1320 may be configured as or otherwise support a means for transmitting, to a UE, one or more signals indicating a first uplink message and a second uplink message that at least partially overlap in time, the first uplink message associated with a first set of parameters including a first quantity of antenna ports, and the second uplink message associated with a second set of parameters including a second quantity of antenna ports. The communications manager 1320 may be configured as or otherwise support a means for receiving, from the UE, the first uplink message and the second uplink message according to a third set of parameters that overrides at least one parameter of the first set of parameters and the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

Figure 14:
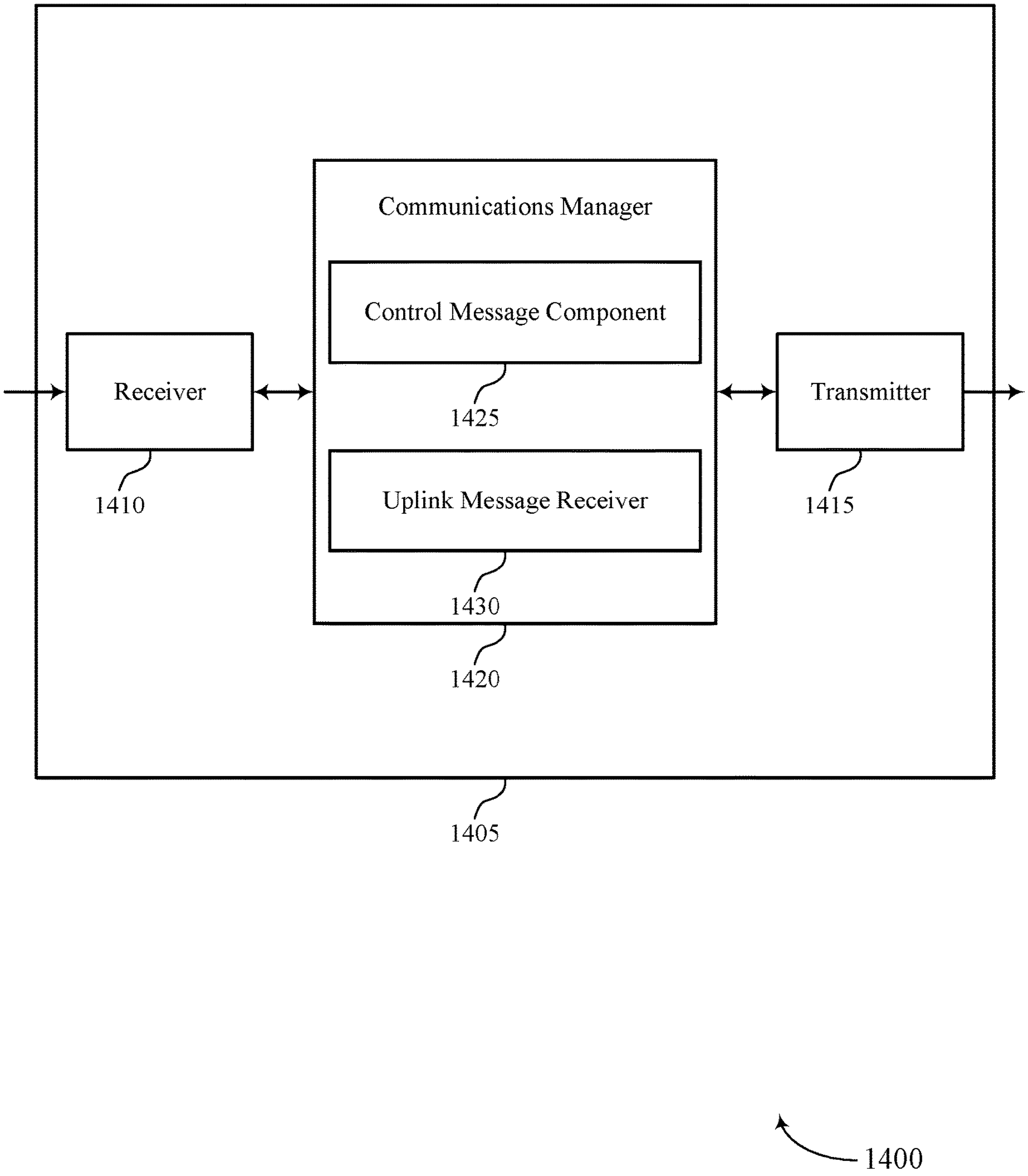

FIG. 14 shows a block diagram 1400 of a device 1405 that supports uplink switching for concurrent transmissions in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to uplink switching for concurrent transmissions). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to uplink switching for concurrent transmissions). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of uplink switching for concurrent transmissions as described herein. For example, the communications manager 1420 may include a control message component 1425 an uplink message receiver 1430, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. The control message component 1425 may be configured as or otherwise support a means for transmitting, to a UE, one or more signals indicating a first uplink message and a second uplink message that at least partially overlap in time, the first uplink message associated with a first set of parameters including a first quantity of antenna ports, and the second uplink message associated with a second set of parameters including a second quantity of antenna ports. The uplink message receiver 1430 may be configured as or otherwise support a means for receiving, from the UE, the first uplink message and the second uplink message according to a third set of parameters that overrides at least one parameter of the first set of parameters and the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

Figure 15:
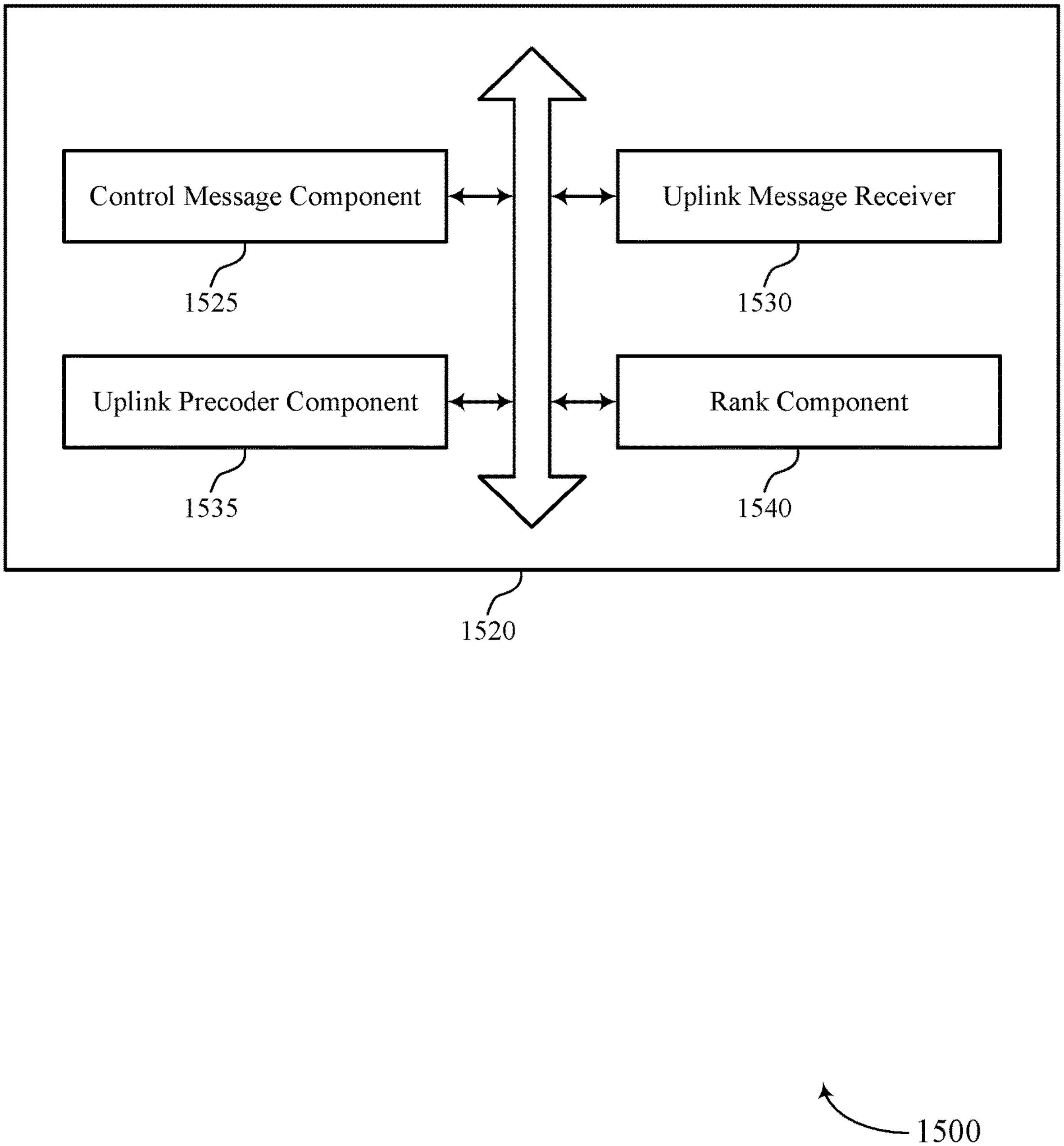
FIG. 15 shows a block diagram of a communications manager that supports uplink switching for concurrent transmissions in accordance with aspects of the present disclosure.

FIG. 15 shows a block diagram 1500 of a communications manager 1520 that supports uplink switching for concurrent transmissions in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of uplink switching for concurrent transmissions as described herein. For example, the communications manager 1520 may include a control message component 1525, an uplink message receiver 1530, an uplink precoder component 1535, a rank component 1540, or any combination thereof. Each of these components may communicate, directly or indirectly, with one another (e.g., via one or more buses).

The communications manager 1520 may support wireless communication at a base station in accordance with examples as disclosed herein. The control message component 1525 may be configured as or otherwise support a means for transmitting, to a UE, one or more signals indicating a first uplink message and a second uplink message that at least partially overlap in time, the first uplink message associated with a first set of parameters including a first quantity of antenna ports, and the second uplink message associated with a second set of parameters including a second quantity of antenna ports. The uplink message receiver 1530 may be configured as or otherwise support a means for receiving, from the UE, the first uplink message and the second uplink message according to a third set of parameters that overrides at least one parameter of the first set of parameters and the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

In some examples, to support receiving the first uplink message and the second uplink message, the uplink message receiver 1530 may be configured as or otherwise support a means for receiving the second uplink message and a payload of the first uplink message that is multiplexed with the second uplink message in accordance with the third quantity of antenna ports, where the third quantity of antenna ports is the same as the second quantity of antenna ports that is associated with the second uplink message. In some examples, the first set of parameters further indicates a rank for transmission of the second uplink message. In some examples, the payload of the first uplink message is multiplexed with the second uplink message based on the rank being greater than a threshold rank.

In some examples, to support receiving the first uplink message and the second uplink message, the uplink precoder component 1535 may be configured as or otherwise support a means for receiving the first uplink message in accordance with the first quantity of antenna ports based on a first uplink precoder of the first set of parameters. In some examples, to support receiving the first uplink message and the second uplink message, the uplink precoder component 1535 may be configured as or otherwise support a means for receiving the second uplink message in accordance with a subset of one or more antenna ports of the second quantity of antenna ports based on a third uplink precoder of the third set of parameters, where the third uplink precoder overrides a second uplink precoder that is indicated via the second set of parameters, and where the third quantity of antenna ports is based on a second sum of the first quantity of antenna ports and a quantity of antenna ports of the subset of one or more antenna ports.

In some examples, to support receiving the second uplink message, the rank component 1540 may be configured as or otherwise support a means for receiving the second uplink message in accordance with the subset of one or more antenna ports based on a rank for transmission of the second uplink message being less than a threshold rank.

In some examples, to support receiving the second uplink message, the rank component 1540 may be configured as or otherwise support a means for receiving the second uplink message using a second quantity of transmission layers based on the third set of parameters overriding the second set of parameters, where the second set of parameters indicates a rank associated with a first quantity of transmission layers that is greater than the second quantity of transmission layers.

In some examples, to support receiving the first uplink message and the second uplink message, the uplink message receiver 1530 may be configured as or otherwise support a means for receiving the first uplink message via a PUCCH. In some examples, to support receiving the first uplink message and the second uplink message, the uplink message receiver 1530 may be configured as or otherwise support a means for receiving the second uplink message via a PUSCH.

In some examples, to support receiving the first uplink message and the second uplink message, the uplink message receiver 1530 may be configured as or otherwise support a means for receiving the first uplink message via a first component carrier. In some examples, to support receiving the first uplink message and the second uplink message, the uplink message receiver 1530 may be configured as or otherwise support a means for receiving the second uplink message via a second component carrier.

Figure 16:
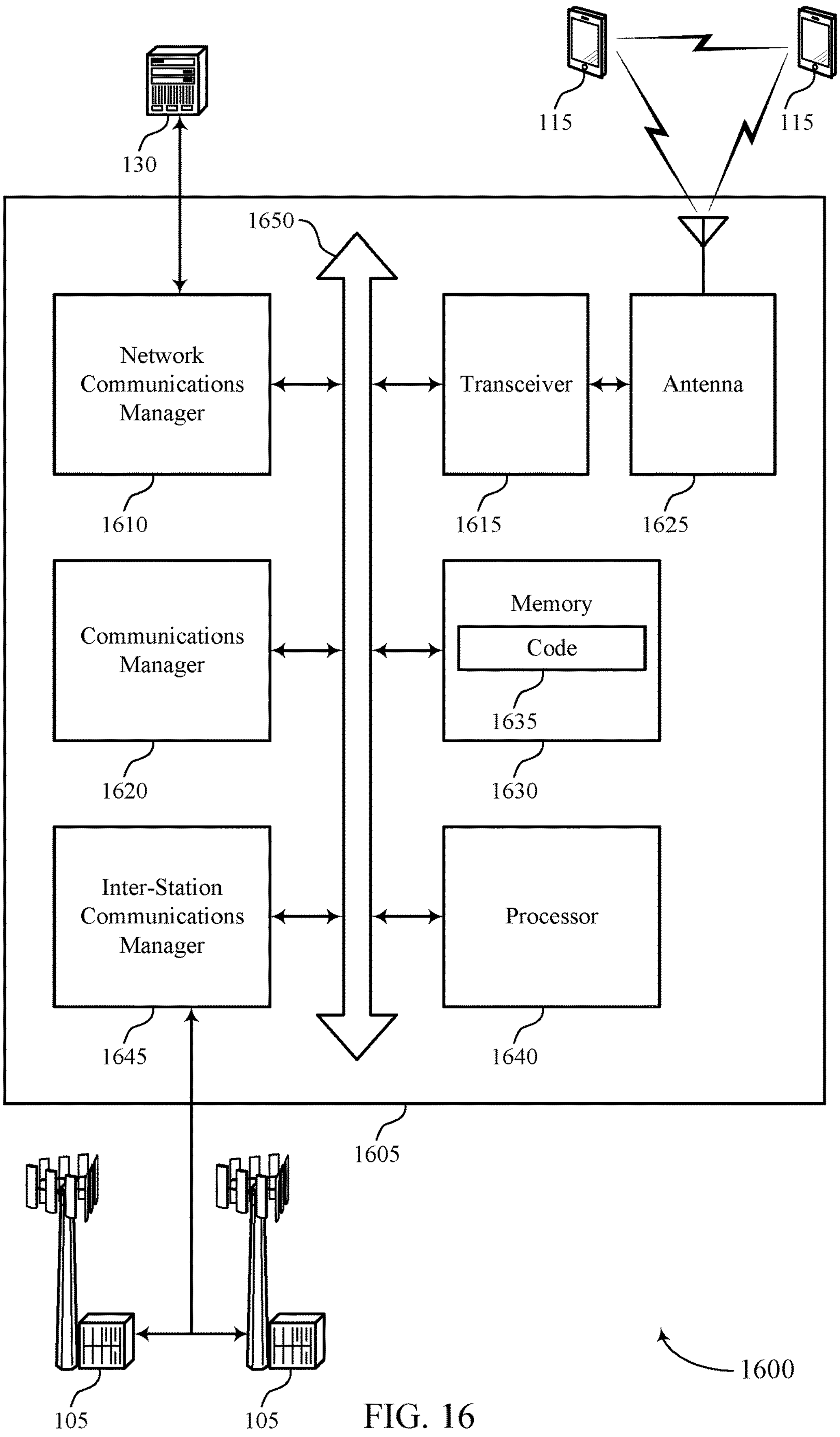
FIG. 16 shows a diagram of a system including a device that supports uplink switching for concurrent transmissions in accordance with aspects of the present disclosure.

FIG. 16 shows a diagram of a system 1600 including a device 1605 that supports uplink switching for concurrent transmissions in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting uplink switching for concurrent transmissions). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at a base station in accordance with examples as disclosed herein. For example, the communications manager 1620 may be configured as or otherwise support a means for transmitting, to a UE, one or more signals indicating a first uplink message and a second uplink message that at least partially overlap in time, the first uplink message associated with a first set of parameters including a first quantity of antenna ports, and the second uplink message associated with a second set of parameters including a second quantity of antenna ports. The communications manager 1620 may be configured as or otherwise support a means for receiving, from the UE, the first uplink message and the second uplink message according to a third set of parameters that overrides at least one parameter of the first set of parameters and the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of uplink switching for concurrent transmissions as described herein, or the processor 1640 and the memory 1630 may be otherwise configured to perform or support such operations.

Figure 17:
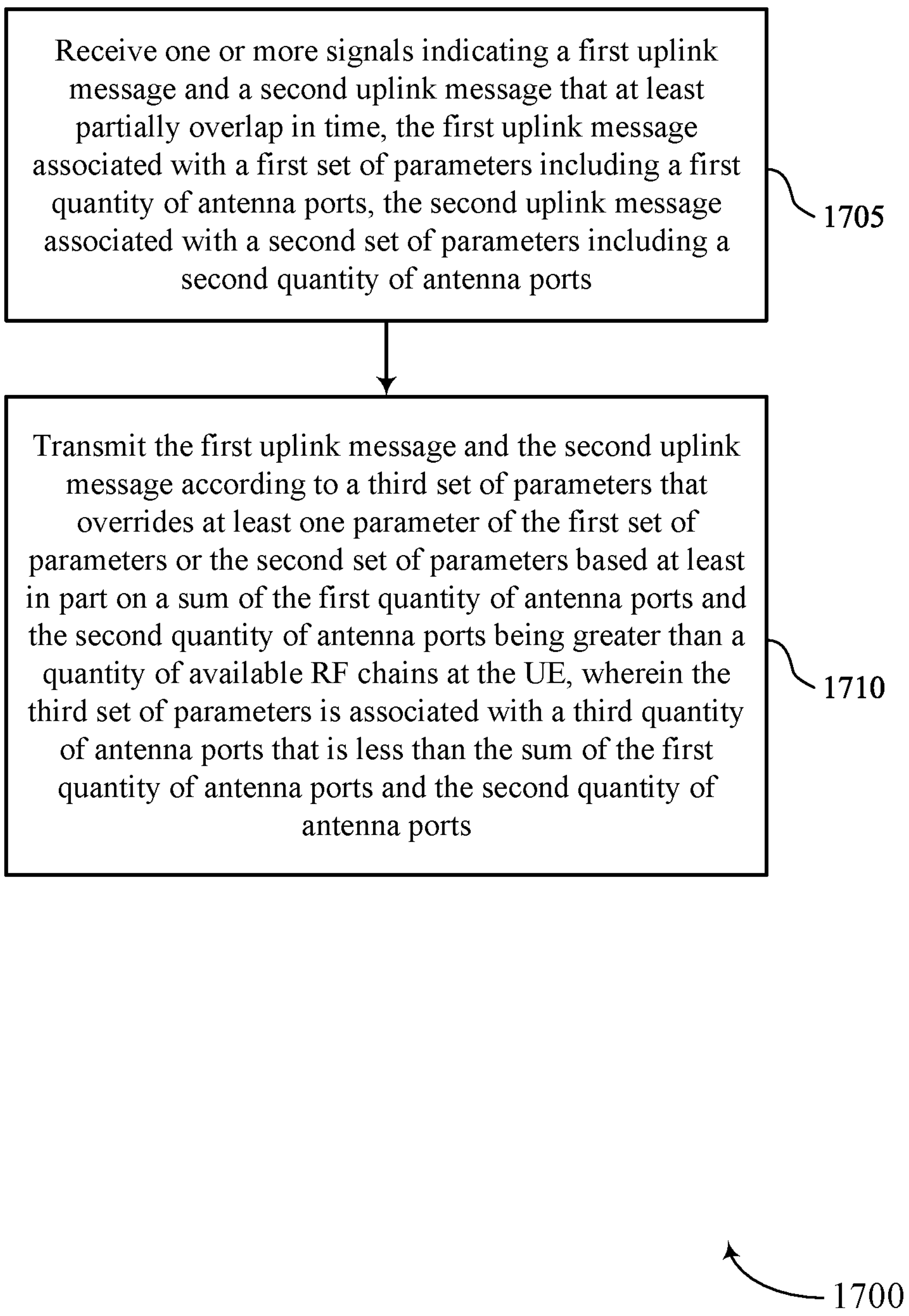
FIGS. 17 through 20 show flowcharts illustrating methods that support uplink switching for concurrent transmissions in accordance with aspects of the present disclosure.

FIG. 17 shows a flowchart illustrating a method 1700 that supports uplink switching for concurrent transmissions in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include receiving one or more signals indicating a first uplink message and a second uplink message that at least partially overlap in time, the first uplink message associated with a first set of parameters including a first quantity of antenna ports, the second uplink message associated with a second set of parameters including a second quantity of antenna ports. The operations of 1705 may be performed in accordance with examples as disclosed herein. In some examples, aspects of the operations of 1705 may be performed by a control message component 1125 as described with reference to FIG. 11.

At 1710, the method may include transmitting the first uplink message and the second uplink message according to a third set of parameters that overrides at least one parameter of the first set of parameters or the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports. The operations of 1710 may be performed in accordance with examples as disclosed herein. In some examples, aspects of the operations of 1710 may be performed by an uplink message transmitter 1130 as described with reference to FIG. 11.

Figure 18:
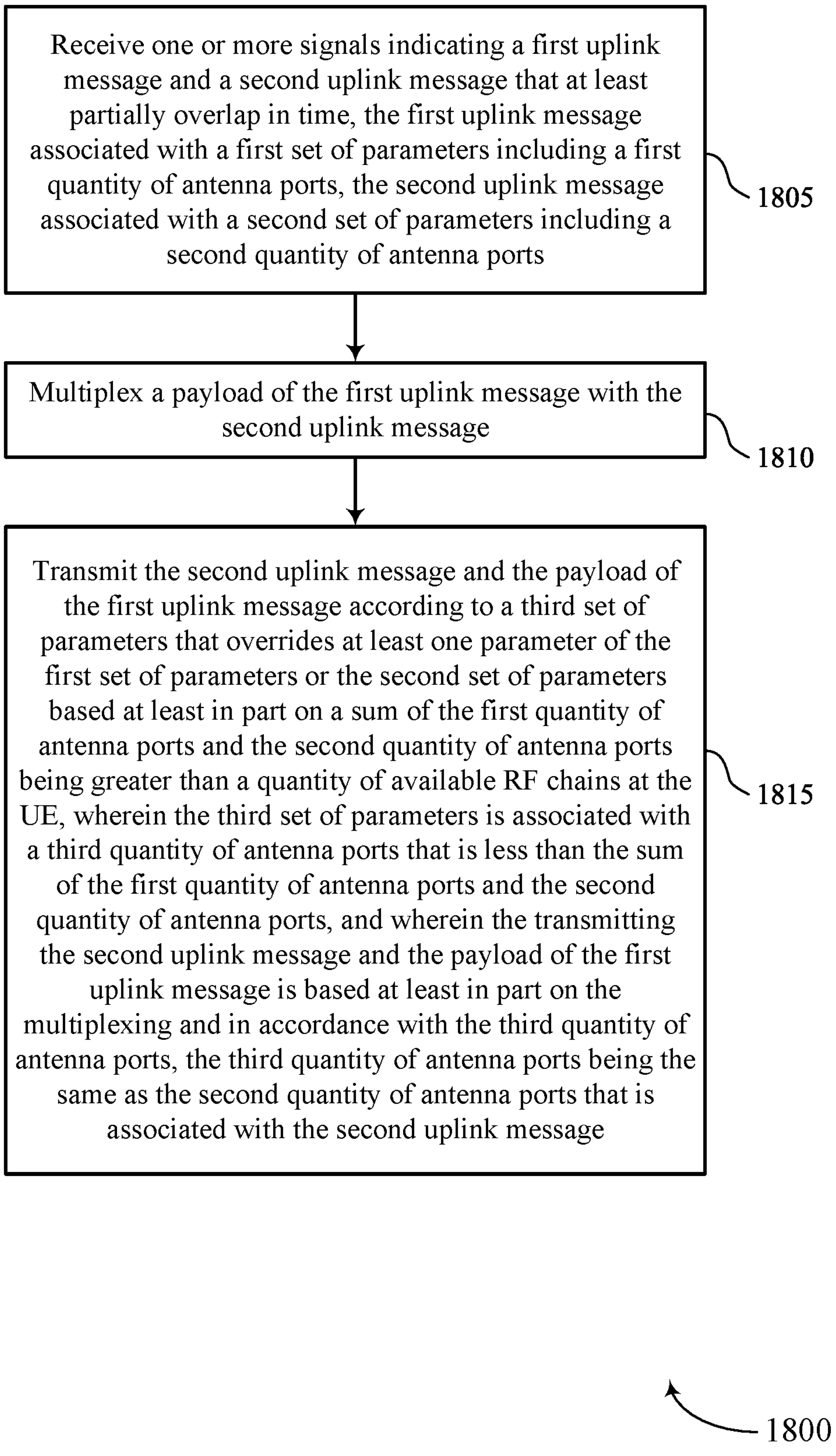

FIG. 18 shows a flowchart illustrating a method 1800 that supports uplink switching for concurrent transmissions in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include receiving one or more signals indicating a first uplink message and a second uplink message that at least partially overlap in time, the first uplink message associated with a first set of parameters including a first quantity of antenna ports, the second uplink message associated with a second set of parameters including a second quantity of antenna ports. The operations of 1805 may be performed in accordance with examples as disclosed herein. In some examples, aspects of the operations of 1805 may be performed by a control message component 1125 as described with reference to FIG. 11.

At 1810, the method may include multiplexing a payload of the first uplink message with the second uplink message. The operations of 1810 may be performed in accordance with examples as disclosed herein. In some examples, aspects of the operations of 1810 may be performed by a multiplexing component 1135 as described with reference to FIG. 11.

At 1815, the method may include transmitting the second uplink message and the payload of the first uplink message according to a third set of parameters that overrides at least one parameter of the first set of parameters or the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports, and where the transmitting the second uplink message and the payload of the first uplink message is based on the multiplexing and in accordance with the third quantity of antenna ports, the third quantity of antenna ports being the same as the second quantity of antenna ports that is associated with the second uplink message. The operations of 1815 may be performed in accordance with examples as disclosed herein. In some examples, aspects of the operations of 1815 may be performed by an uplink message transmitter 1130 as described with reference to FIG. 11.

Figure 19:
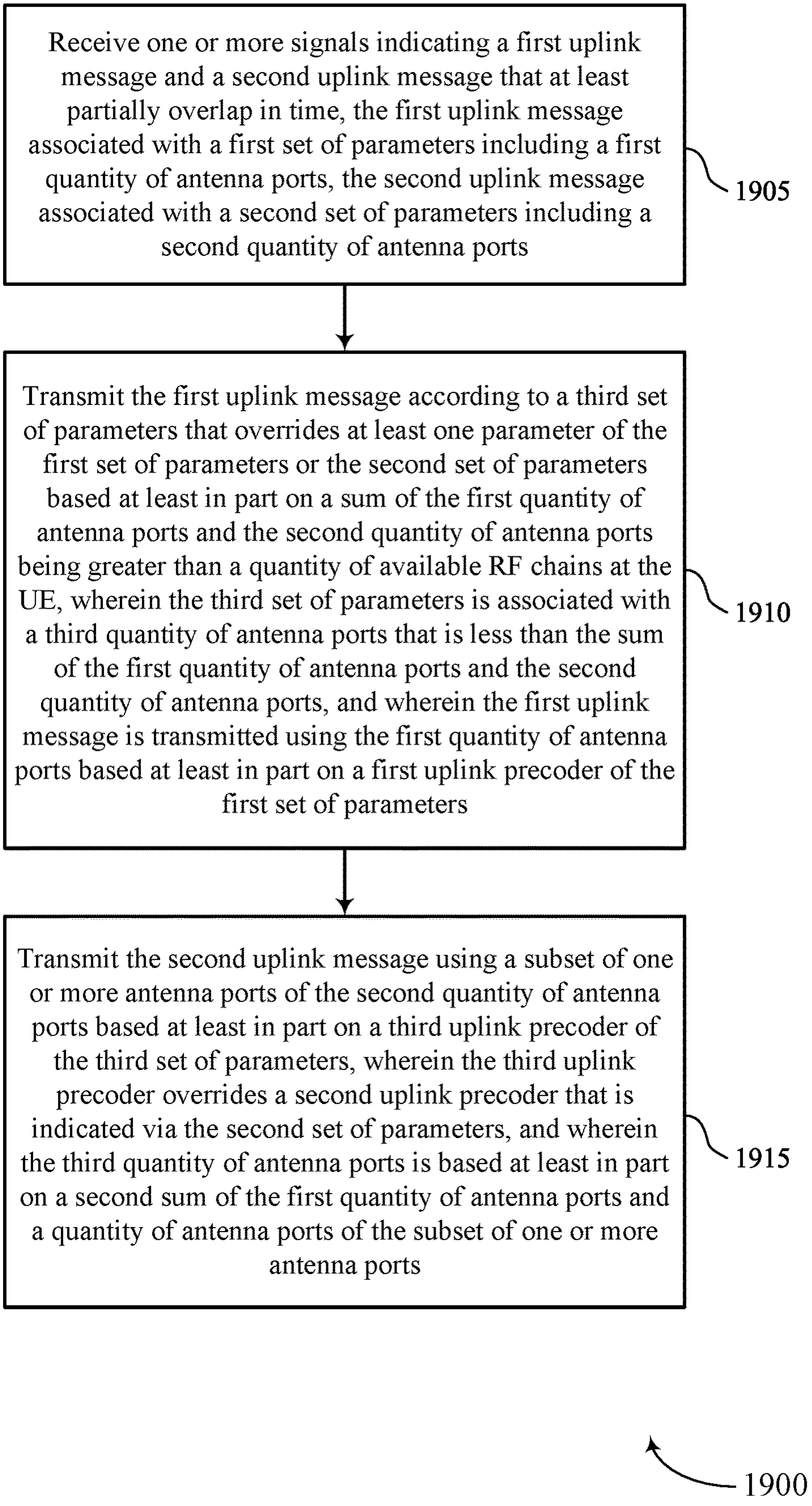

FIG. 19 shows a flowchart illustrating a method 1900 that supports uplink switching for concurrent transmissions in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1905, the method may include receiving one or more signals indicating a first uplink message and a second uplink message that at least partially overlap in time, the first uplink message associated with a first set of parameters including a first quantity of antenna ports, the second uplink message associated with a second set of parameters including a second quantity of antenna ports. The operations of 1905 may be performed in accordance with examples as disclosed herein. In some examples, aspects of the operations of 1905 may be performed by a control message component 1125 as described with reference to FIG. 11.

At 1910, the method may include transmitting the first uplink message according to a third set of parameters that overrides at least one parameter of the first set of parameters or the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports, and where the first uplink message is transmitted using the first quantity of antenna ports based on a first uplink precoder of the first set of parameters. The operations of 1910 may be performed in accordance with examples as disclosed herein. In some examples, aspects of the operations of 1910 may be performed by an uplink message transmitter 1130 as described with reference to FIG. 11.

At 1915, the method may include transmitting the second uplink message using a subset of one or more antenna ports of the second quantity of antenna ports based on a third uplink precoder of the third set of parameters, where the third uplink precoder overrides a second uplink precoder that is indicated via the second set of parameters, and where the third quantity of antenna ports is based on a second sum of the first quantity of antenna ports and a quantity of antenna ports of the subset of one or more antenna ports. The operations of 1915 may be performed in accordance with examples as disclosed herein. In some examples, aspects of the operations of 1915 may be performed by an uplink precoder component 1140 as described with reference to FIG. 11.

Figure 20:
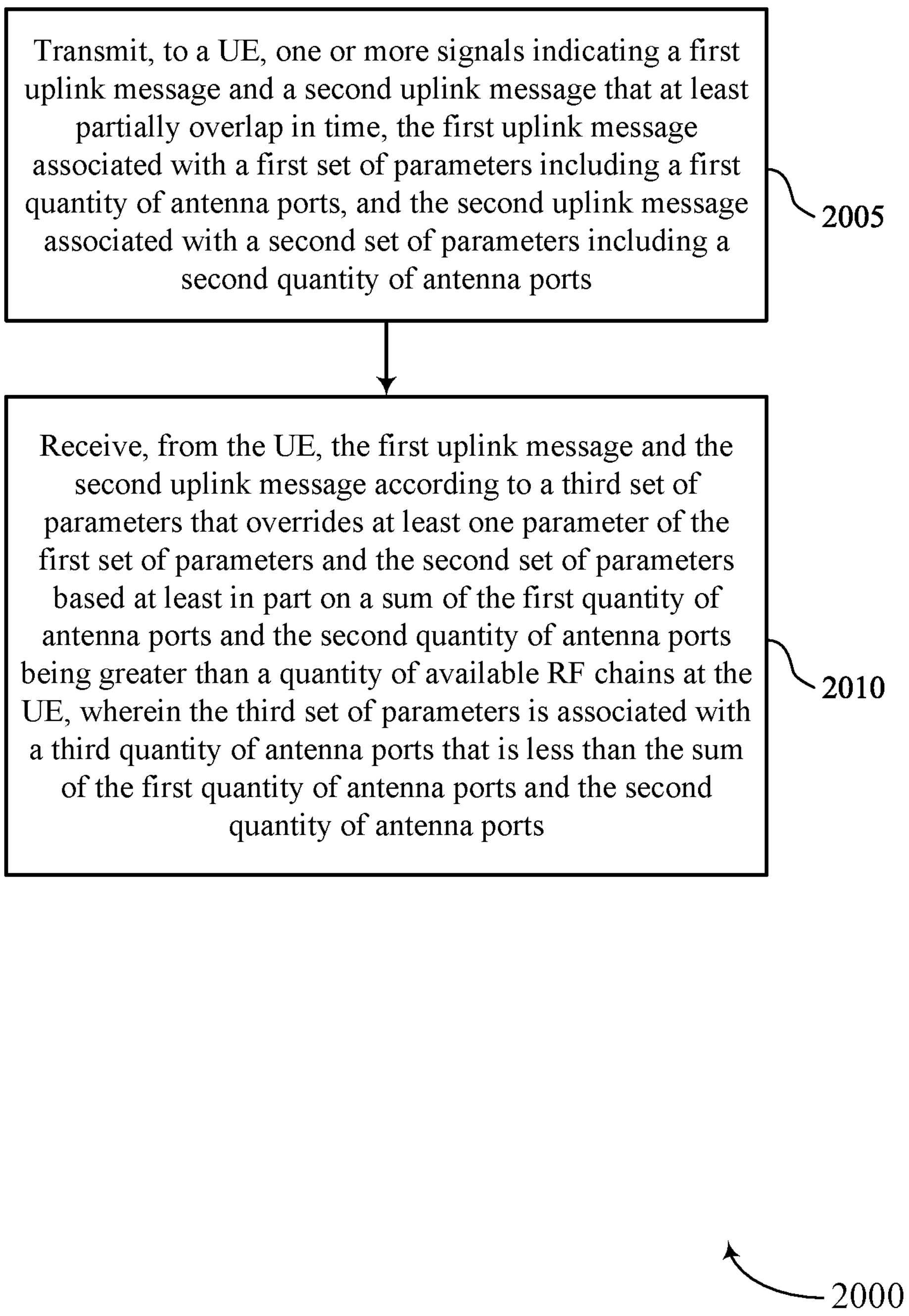

FIG. 20 shows a flowchart illustrating a method 2000 that supports uplink switching for concurrent transmissions in accordance with aspects of the present disclosure. The operations of the method 2000 may be implemented by a base station or its components as described herein. For example, the operations of the method 2000 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, one or more signals indicating a first uplink message and a second uplink message that at least partially overlap in time, the first uplink message associated with a first set of parameters including a first quantity of antenna ports, and the second uplink message associated with a second set of parameters including a second quantity of antenna ports. The operations of 2005 may be performed in accordance with examples as disclosed herein. In some examples, aspects of the operations of 2005 may be performed by a control message component 1525 as described with reference to FIG. 15.

At 2010, the method may include receiving, from the UE, the first uplink message and the second uplink message according to a third set of parameters that overrides at least one parameter of the first set of parameters and the second set of parameters based on a sum of the first quantity of antenna ports and the second quantity of antenna ports being greater than a quantity of available RF chains at the UE, where the third set of parameters is associated with a third quantity of antenna ports that is less than the sum of the first quantity of antenna ports and the second quantity of antenna ports. The operations of 2010 may be performed in accordance with examples as disclosed herein. In some examples, aspects of the operations of 2010 may be performed by an uplink message receiver 1530 as described with reference to FIG. 15.

The following provides an overview of aspects of the present disclosure:

Aspect 1: A method for wireless communication at a UE, comprising: receiving one or more signals indicating a first uplink message and a second uplink message that at least partially overlap in time, the first uplink message associated with a first set of parameters including a first quantity of antenna ports, the second uplink message associated with a second set of parameters including a second quantity of antenna ports; and transmitting the first uplink message and the second uplink message according to a third set of parameters that overrides at least one parameter of the first set of parameters or the second set of parameters based at least in part on a sum of the first quantity of antenna ports and the second quantity of antenna ports being greater than a quantity of available RF chains at the UE, wherein the third set of parameters is associated with a third quantity of antenna ports that is less than the sum of the first quantity of antenna ports and the second quantity of antenna ports.

Aspect 2: The method of aspect 1, wherein transmitting the first uplink message and the second uplink message comprises: multiplexing a payload of the first uplink message with the second uplink message; and transmitting the second uplink message and the payload of the first uplink message based at least in part on the multiplexing and in accordance with the third quantity of antenna ports, wherein the third quantity of antenna ports is the same as the second quantity of antenna ports that is associated with the second uplink message.

Aspect 3: The method of aspect 2, wherein multiplexing the payload of the first uplink message with the second uplink message further comprises: multiplexing the payload of the first uplink message with the second uplink message based at least in part on a rank for transmission of the second uplink message being greater than a threshold rank.

Aspect 4: The method of aspect 1, wherein transmitting the first uplink message and the second uplink message comprises: transmitting the first uplink message using the first quantity of antenna ports based at least in part on a first uplink precoder of the first set of parameters; and transmitting the second uplink message using a subset of one or more antenna ports of the second quantity of antenna ports based at least in part on a third uplink precoder of the third set of parameters, wherein the third uplink precoder overrides a second uplink precoder that is indicated via the second set of parameters, and wherein the third quantity of antenna ports is based at least in part on a second sum of the first quantity of antenna ports and a quantity of antenna ports of the subset of one or more antenna ports.

Aspect 5: The method of aspect 4, wherein transmitting the second uplink message comprises: transmitting the second uplink message using the subset of one or more antenna ports based at least in part on a rank for transmission of the second uplink message being less than a threshold rank.

Aspect 6: The method of aspect 1, wherein transmitting the second uplink message comprises: transmitting the second uplink message using a second quantity of transmission layers based at least in part on the third set of parameters overriding the second set of parameters, wherein the second set of parameters indicates a rank associated with a first quantity of transmission layers that is greater than the second quantity of transmission layers.

Aspect 7: The method of any of aspects 1 through 6, wherein transmitting the first uplink message and the second uplink message comprises: transmitting the first uplink message via a PUCCH; and transmitting the second uplink message via a PUSCH.

Aspect 8: The method of any of aspects 1 through 7, wherein transmitting the first uplink message and the second uplink message comprises: transmitting the first uplink message via a first component carrier; and transmitting the second uplink message via a second component carrier.

Aspect 9: A method for wireless communication at a base station, comprising: transmitting, to a UE, one or more signals indicating a first uplink message and a second uplink message that at least partially overlap in time, the first uplink message associated with a first set of parameters including a first quantity of antenna ports, and the second uplink message associated with a second set of parameters including a second quantity of antenna ports; and receiving, from the UE, the first uplink message and the second uplink message according to a third set of parameters that overrides at least one parameter of the first set of parameters and the second set of parameters based at least in part on a sum of the first quantity of antenna ports and the second quantity of antenna ports being greater than a quantity of available RF chains at the UE, wherein the third set of parameters is associated with a third quantity of antenna ports that is less than the sum of the first quantity of antenna ports and the second quantity of antenna ports.

Aspect 10: The method of aspect 9, wherein receiving the first uplink message and the second uplink message comprises: receiving the second uplink message and a payload of the first uplink message that is multiplexed with the second uplink message in accordance with the third quantity of antenna ports, wherein the third quantity of antenna ports is the same as the second quantity of antenna ports that is associated with the second uplink message.

Aspect 11: The method of aspect 10, wherein the first set of parameters further indicates a rank for transmission of the second uplink message; and the payload of the first uplink message is multiplexed with the second uplink message based at least in part on the rank being greater than a threshold rank.

Aspect 12: The method of aspect 9, wherein receiving the first uplink message and the second uplink message comprises: receiving the first uplink message in accordance with the first quantity of antenna ports based at least in part on a first uplink precoder of the first set of parameters; and receiving the second uplink message in accordance with a subset of one or more antenna ports of the second quantity of antenna ports based at least in part on a third uplink precoder of the third set of parameters, wherein the third uplink precoder overrides a second uplink precoder that is indicated via the second set of parameters, and wherein the third quantity of antenna ports is based at least in part on a second sum of the first quantity of antenna ports and a quantity of antenna ports of the subset of one or more antenna ports.

Aspect 13: The method of aspect 12, wherein receiving the second uplink message comprises: receiving the second uplink message in accordance with the subset of one or more antenna ports based at least in part on a rank for transmission of the second uplink message being less than a threshold rank.

Aspect 14: The method of aspect 9, wherein receiving the second uplink message comprises: receiving the second uplink message using a second quantity of transmission layers based at least in part on the third set of parameters overriding the second set of parameters, wherein the second set of parameters indicates a rank associated with a first quantity of transmission layers that is greater than the second quantity of transmission layers.

Aspect 15: The method of any of aspects 9 through 14, wherein receiving the first uplink message and the second uplink message comprises: receiving the first uplink message via a PUCCH; and receiving the second uplink message via a PUSCH.

Aspect 16: The method of any of aspects 9 through 15, wherein receiving the first uplink message and the second uplink message comprises: receiving the first uplink message via a first component carrier; and receiving the second uplink message via a second component carrier.

Aspect 17: An apparatus for wireless communication at a UE, comprising a processor; memory coupled with the processor; and instructions stored in the memory and executable by the processor to cause the apparatus to perform a method of any of aspects 1 through 8.

Aspect 18: An apparatus for wireless communication at a UE, comprising at least one means for performing a method of any of aspects 1 through 8.

Aspect 19: A non-transitory computer-readable medium storing code for wireless communication at a UE, the code comprising instructions executable by a processor to perform a method of any of aspects 1 through 8.

Aspect 20: An apparatus for wireless communication at a base station, comprising a processor; memory coupled with the processor; and instructions stored in the memory and executable by the processor to cause the apparatus to perform a method of any of aspects 9 through 16.

Aspect 21: An apparatus for wireless communication at a base station, comprising at least one means for performing a method of any of aspects 9 through 16.

Aspect 22: A non-transitory computer-readable medium storing code for wireless communication at a base station, the code comprising instructions executable by a processor to perform a method of any of aspects 9 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving one or more signals indicating a first uplink message and a second uplink message that at least partially overlap in time, the first uplink message associated with a first set of parameters including a first quantity of antenna ports, the second uplink message associated with a second set of parameters including a second quantity of antenna ports; and transmitting the first uplink message and the second uplink message according to a third set of parameters that overrides at least one parameter of the first set of parameters or the second set of parameters based at least in part on a sum of the first quantity of antenna ports and the second quantity of antenna ports being greater than a quantity of available radio frequency chains at the UE, wherein the third set of parameters is associated with a third quantity of antenna ports that is less than the sum of the first quantity of antenna ports and the second quantity of antenna ports.

2. The method of claim 1, wherein transmitting the first uplink message and the second uplink message comprises:

multiplexing a payload of the first uplink message with the second uplink message; and transmitting the second uplink message and the payload of the first uplink message based at least in part on the multiplexing and in accordance with the third quantity of antenna ports, wherein the third quantity of antenna ports is the same as the second quantity of antenna ports that is associated with the second uplink message.

3. The method of claim 2, wherein multiplexing the payload of the first uplink message with the second uplink message further comprises:

multiplexing the payload of the first uplink message with the second uplink message based at least in part on a rank for transmission of the second uplink message being greater than a threshold rank.

4. The method of claim 1, wherein transmitting the first uplink message and the second uplink message comprises:

transmitting the first uplink message using the first quantity of antenna ports based at least in part on a first uplink precoder of the first set of parameters; and transmitting the second uplink message using a subset of one or more antenna ports of the second quantity of antenna ports based at least in part on a third uplink precoder of the third set of parameters, wherein the third uplink precoder overrides a second uplink precoder that is indicated via the second set of parameters, and wherein the third quantity of antenna ports is based at least in part on a second sum of the first quantity of antenna ports and a quantity of antenna ports of the subset of one or more antenna ports.

5. The method of claim 4, wherein transmitting the second uplink message comprises:

transmitting the second uplink message using the subset of one or more antenna ports based at least in part on a rank for transmission of the second uplink message being less than a threshold rank.

6. The method of claim 1, wherein transmitting the second uplink message comprises:

transmitting the second uplink message using a second quantity of transmission layers based at least in part on the third set of parameters overriding the second set of parameters, wherein the second set of parameters indicates a rank associated with a first quantity of transmission layers that is greater than the second quantity of transmission layers.

7. The method of claim 1, wherein transmitting the first uplink message and the second uplink message comprises:

transmitting the first uplink message via a physical uplink control channel; and transmitting the second uplink message via a physical uplink shared channel.

8. The method of claim 1, wherein transmitting the first uplink message and the second uplink message comprises:

transmitting the first uplink message via a first component carrier; and transmitting the second uplink message via a second component carrier.

9. A method for wireless communication at a base station, comprising:

transmitting, to a user equipment (UE), one or more signals indicating a first uplink message and a second uplink message that at least partially overlap in time, the first uplink message associated with a first set of parameters including a first quantity of antenna ports, and the second uplink message associated with a second set of parameters including a second quantity of antenna ports; and receiving, from the UE, the first uplink message and the second uplink message according to a third set of parameters that overrides at least one parameter of the first set of parameters and the second set of parameters based at least in part on a sum of the first quantity of antenna ports and the second quantity of antenna ports being greater than a quantity of available radio frequency chains at the UE, wherein the third set of parameters is associated with a third quantity of antenna ports that is less than the sum of the first quantity of antenna ports and the second quantity of antenna ports.

10. The method of claim 9, wherein receiving the first uplink message and the second uplink message comprises:

receiving the second uplink message and a payload of the first uplink message that is multiplexed with the second uplink message in accordance with the third quantity of antenna ports, wherein the third quantity of antenna ports is the same as the second quantity of antenna ports that is associated with the second uplink message.

11. The method of claim 10, wherein:

the first set of parameters further indicates a rank for transmission of the second uplink message; and the payload of the first uplink message is multiplexed with the second uplink message based at least in part on the rank being greater than a threshold rank.

12. The method of claim 9, wherein receiving the first uplink message and the second uplink message comprises:

receiving the first uplink message in accordance with the first quantity of antenna ports based at least in part on a first uplink precoder of the first set of parameters; and receiving the second uplink message in accordance with a subset of one or more antenna ports of the second quantity of antenna ports based at least in part on a third uplink precoder of the third set of parameters, wherein the third uplink precoder overrides a second uplink precoder that is indicated via the second set of parameters, and wherein the third quantity of antenna ports is based at least in part on a second sum of the first quantity of antenna ports and a quantity of antenna ports of the subset of one or more antenna ports.

13. The method of claim 12, wherein receiving the second uplink message comprises:

receiving the second uplink message in accordance with the subset of one or more antenna ports based at least in part on a rank for transmission of the second uplink message being less than a threshold rank.

14. The method of claim 9, wherein receiving the second uplink message comprises:

receiving the second uplink message using a second quantity of transmission layers based at least in part on the third set of parameters overriding the second set of parameters, wherein the second set of parameters indicates a rank associated with a first quantity of transmission layers that is greater than the second quantity of transmission layers.

15. The method of claim 9, wherein receiving the first uplink message and the second uplink message comprises:

receiving the first uplink message via a physical uplink control channel; and receiving the second uplink message via a physical uplink shared channel.

16. The method of claim 9, wherein receiving the first uplink message and the second uplink message comprises:

receiving the first uplink message via a first component carrier; and receiving the second uplink message via a second component carrier.

17. An apparatus for wireless communication at a user equipment (UE), comprising:

a processor;

memory coupled with the processor; and instructions stored in the memory and executable by the processor to cause the apparatus to:

receive one or more signals indicating a first uplink message and a second uplink message that at least partially overlap in time, the first uplink message associated with a first set of parameters including a first quantity of antenna ports, the second uplink message associated with a second set of parameters including a second quantity of antenna ports; and transmit the first uplink message and the second uplink message according to a third set of parameters that overrides at least one parameter of the first set of parameters or the second set of parameters based at least in part on a sum of the first quantity of antenna ports and the second quantity of antenna ports being greater than a quantity of available radio frequency chains at the UE, wherein the third set of parameters is associated with a third quantity of antenna ports that is less than the sum of the first quantity of antenna ports and the second quantity of antenna ports.

18. The apparatus of claim 17, wherein the instructions to transmit the first uplink message and the second uplink message are executable by the processor to cause the apparatus to:

multiplex a payload of the first uplink message with the second uplink message; and transmit the second uplink message and the payload of the first uplink message based at least in part on the multiplexing and in accordance with the third quantity of antenna ports, wherein the third quantity of antenna ports is the same as the second quantity of antenna ports that is associated with the second uplink message.

19. The apparatus of claim 18, wherein the instructions to multiplex the payload of the first uplink message with the second uplink message are further executable by the processor to cause the apparatus to:

multiplex the payload of the first uplink message with the second uplink message based at least in part on a rank for transmission of the second uplink message being greater than a threshold rank.

20. The apparatus of claim 17, wherein the instructions to transmit the first uplink message and the second uplink message are executable by the processor to cause the apparatus to:

transmit the first uplink message using the first quantity of antenna ports based at least in part on a first uplink precoder of the first set of parameters; and transmit the second uplink message using a subset of one or more antenna ports of the second quantity of antenna ports based at least in part on a third uplink precoder of the third set of parameters, wherein the third uplink precoder overrides a second uplink precoder that is indicated via the second set of parameters, and wherein the third quantity of antenna ports is based at least in part on a second sum of the first quantity of antenna ports and a quantity of antenna ports of the subset of one or more antenna ports.

21. The apparatus of claim 20, wherein the instructions to transmit the second uplink message are executable by the processor to cause the apparatus to:

transmit the second uplink message using the subset of one or more antenna ports based at least in part on a rank for transmission of the second uplink message being less than a threshold rank.

22. The apparatus of claim 17, wherein the instructions to transmit the second uplink message are executable by the processor to cause the apparatus to:

transmit the second uplink message using a second quantity of transmission layers based at least in part on the third set of parameters overriding the second set of parameters, wherein the second set of parameters indicates a rank associated with a first quantity of transmission layers that is greater than the second quantity of transmission layers.

23. The apparatus of claim 17, wherein the instructions to transmit the first uplink message and the second uplink message are executable by the processor to cause the apparatus to:

transmit the first uplink message via a physical uplink control channel; and transmit the second uplink message via a physical uplink shared channel.

24. The apparatus of claim 17, wherein the instructions to transmit the first uplink message and the second uplink message are executable by the processor to cause the apparatus to:

transmit the first uplink message via a first component carrier; and transmit the second uplink message via a second component carrier.

25. An apparatus for wireless communication at a base station, comprising:

a processor;

memory coupled with the processor; and instructions stored in the memory and executable by the processor to cause the apparatus to:

transmit, to a user equipment (UE), one or more signals indicating a first uplink message and a second uplink message that at least partially overlap in time, the first uplink message associated with a first set of parameters including a first quantity of antenna ports, and the second uplink message associated with a second set of parameters including a second quantity of antenna ports; and receive, from the UE, the first uplink message and the second uplink message according to a third set of parameters that overrides at least one parameter of the first set of parameters and the second set of parameters based at least in part on a sum of the first quantity of antenna ports and the second quantity of antenna ports being greater than a quantity of available radio frequency chains at the UE, wherein the third set of parameters is associated with a third quantity of antenna ports that is less than the sum of the first quantity of antenna ports and the second quantity of antenna ports.

26. The apparatus of claim 25, wherein the instructions to receive the first uplink message and the second uplink message are executable by the processor to cause the apparatus to:

receive the second uplink message and a payload of the first uplink message that is multiplexed with the second uplink message in accordance with the third quantity of antenna ports, wherein the third quantity of antenna ports is the same as the second quantity of antenna ports that is associated with the second uplink message.

27. The apparatus of claim 26, wherein:

the first set of parameters further indicates a rank for transmission of the second uplink message; and the payload of the first uplink message is multiplexed with the second uplink message based at least in part on the rank being greater than a threshold rank.

28. The apparatus of claim 25, wherein the instructions to receive the first uplink message and the second uplink message are executable by the processor to cause the apparatus to:

receive the first uplink message in accordance with the first quantity of antenna ports based at least in part on a first uplink precoder of the first set of parameters; and receive the second uplink message in accordance with a subset of one or more antenna ports of the second quantity of antenna ports based at least in part on a third uplink precoder of the third set of parameters, wherein the third uplink precoder overrides a second uplink precoder that is indicated via the second set of parameters, and wherein the third quantity of antenna ports is based at least in part on a second sum of the first quantity of antenna ports and a quantity of antenna ports of the subset of one or more antenna ports.

29. The apparatus of claim 28, wherein the instructions to receive the second uplink message are executable by the processor to cause the apparatus to:

receive the second uplink message in accordance with the subset of one or more antenna ports based at least in part on a rank for transmission of the second uplink message being less than a threshold rank.

30. The apparatus of claim 25, wherein the instructions to receive the second uplink message are executable by the processor to cause the apparatus to:

receive the second uplink message using a second quantity of transmission layers based at least in part on the third set of parameters overriding the second set of parameters, wherein the second set of parameters indicates a rank associated with a first quantity of transmission layers that is greater than the second quantity of transmission layers.

* * * * *